United States Patent
Homayounfar et al.

(10) Patent No.: US 11,562,490 B2
(45) Date of Patent: Jan. 24, 2023

(54) SYSTEMS AND METHODS FOR VIDEO OBJECT SEGMENTATION

(71) Applicant: UATC, LLC, Mountain View, CA (US)

(72) Inventors: Namdar Homayounfar, Toronto (CA); Wei-Chiu Ma, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/528,567

(22) Filed: Nov. 17, 2021

(65) Prior Publication Data

US 2022/0156939 A1 May 19, 2022

Related U.S. Application Data

(60) Provisional application No. 63/114,811, filed on Nov. 17, 2020.

(51) Int. Cl.
*G06T 7/11* (2017.01)
*G06V 10/22* (2022.01)
(Continued)

(52) U.S. Cl.
CPC .............. *G06T 7/11* (2017.01); *G06K 9/6263* (2013.01); *G06N 3/0454* (2013.01); *G06T 7/174* (2017.01);
(Continued)

(58) Field of Classification Search
CPC ............. G06T 7/11; G06T 2207/20081; G06T 2207/20084; G06T 2207/30252;
(Continued)

(56) References Cited

U.S. PATENT DOCUMENTS 6,035,067 A 3/2000 Ponticos
10,810,435 B2* 10/2020 Lee ...................... G06K 9/6271
(Continued)

OTHER PUBLICATIONS

Jang et al. "Online Video Object Segmentation via Convolutional Trident Network." IEEE Conference on Computer Vision and Pattern Recognition, Jul. 21, 2017, pp. 7474-7483 (Year: 2017).*
(Continued)

*Primary Examiner* — Jon Chang
(74) *Attorney, Agent, or Firm* — Dority & Manning, P.A.

(57) ABSTRACT

Systems and methods for generating object segmentations across videos are provided. An example system can enable an annotator to identify objects within a first image frame of a video sequence by clicking anywhere within the object. The system processes the first image frame and a second, subsequent, image frame to assign each pixel of the second image frame to one of the objects identified in the first image frame or the background. The system refines the resulting object masks for the second image frame using a recurrent attention module based on contextual features extracted from the second image frame. The system receives additional user input for the second image frame and uses the input, in combination with the object masks for the second image frame, to determine object masks for a third, subsequent, image frame in the video sequence. The process is repeated for each image in the video sequence.

17 Claims, 10 Drawing Sheets

(51) Int. Cl.
*G06V 10/82* (2022.01)
*G06K 9/62* (2022.01)
*G06N 3/04* (2006.01)
*G06T 7/174* (2017.01)
*G06V 20/56* (2022.01)
*G06V 20/70* (2022.01)

(52) U.S. Cl.
CPC .............. *G06T 2207/20081* (2013.01); *G06T 2207/20084* (2013.01); *G06T 2207/20101* (2013.01); *G06T 2207/30252* (2013.01); *G06V 10/235* (2022.01); *G06V 10/82* (2022.01); *G06V 20/56* (2022.01); *G06V 20/70* (2022.01)

(58) Field of Classification Search
CPC .......... G06T 7/174; G06T 2207/20101; G06V 10/235; G06V 10/82; G06V 20/56; G06V 20/70; G06K 9/6263
See application file for complete search history.

(56) References Cited

U.S. PATENT DOCUMENTS

| | | | |
|---|---|---|---|
| 2010/0046830 A1* | 2/2010 | Wang | G06T 7/12 382/164 |
| 2013/0216094 A1 | 8/2013 | DeLean | |
| 2017/0351936 A1 | 12/2017 | Jiang | |
| 2018/0348346 A1 | 12/2018 | Vallespi-Gonzalez et al. | |
| 2019/0171912 A1 | 6/2019 | Vallespi-Gonzalez et al. | |
| 2020/0160528 A1* | 5/2020 | Rhodes | G06V 20/49 |

OTHER PUBLICATIONS

International Search Report and Written Opinion for Application No. PCT/US2021/059674, dated Feb. 14, 2022, 8 pages.
Acuna et al. "Efficient Interactive Annotation of Segmentation Datasets with Polygon-Rnn++." Proceedings of the IEEE Conference on Computer Vision and Pattern Recogmtion, 2018, pp. 859-868.
Athar et al. "Stem-Seg: Spatio-Temporal Embeddings for Instance Segmentation in Videos." European Conference on Computer Vision, Springer, Cham, 2020, pp. 158-177.
Bai et al. "Error-Tolerant Scribbles Based Interactive Image Segmentation." In Proceedings of the IEEE Conference on Computer Vision and Pattern Recognition, 2014, pp. 392-399.
Bai et al. "Deep Watershed Transform for Instance Segmentation." In Proceedings of the IEEE Conference on Computer Vision and Pattern Recognition, 2017, pp. 5221-5229.
Bansal et al. "Pixelnet: Representation of the Pixels, by the Pixels, and for the Pixels." arXiv preprint arXiv: 1702.06506, 2017, 17 pages.
Bertasius et al. "Classifying, Segmenting, and Tracking Object Instances in Video with Mask Propagation." In Proceedings of the IEEE/CVF Conference on Computer Vision and Pattern Recognition, 2020, pp. 9739-9748.
De Brabandere et al. "Semantic Instance Segmentation with a Discriminative Loss Function." arXiv preprint arXiv:1708.02551, 2017, 10 pages.
Cai et al. "Cascade R-Cnn: Delving into High Quality Object Detection." In Proceedings of the IEEE Conference on Computer Vision and Pattern Recognition, 2018, pp. 6154-6162.
Cao et al. "Sipmask: Spatial Information Preservation for Fast Image and Video Instance Segmentation." In European Conference on Computer Vision, 2020, pp. 1-18.
Cao et al. "D2det: Towards High Quality Object Detection and Instance Segmentation." In Proceedings of the IEEE/CVF Conference on Computer Vision and Pattern Recognition, 2020, pp. 11485-11494.
Castrejon et al. "Annotating Object Instances with a Polygon-Rnn." In Proceedings of the IEEE Conference on Computer Vision and Pattern Recognition, 2017, pp. 5230-5238.
Chen et al. "Scribblebox: Interactive Annotation Framework for Video Object Segmentation." In European Conference on Computer Vision, 2020, pp. 293-310.
Chen et al. "Hybrid Task Cascade for Instance Segmentation." In Proceedings of the IEEE/CVF Conference on Computer Vision and Pattern Recognition, 2019, pp. 4974-4983.
Chen et al. "Masklab: Instance Segmentation by Refining Object Detection with Semantic and Direction Features." In Proceedings of the IEEE Conference on Computer Vision and Pattern Recognition, 2018, pp. 4013-4022.
Chen et al. "Training Deep Nets with Sublinear Memory Cost." arXiv preprint arXiv:1604.06174, 2016, pp. 1-12.
Cordts et al. "The Cityscapes Dataset for Semantic Urban Scene Understanding." In Proceedings of the IEEE Conference on Computer Vision and Pattern Recognition, 2016, pp. 3213-3223.
Dai et al. "Instance-Aware Semantic Segmentation Via Multi-Task Network Cascades." In Proceedings of the IEEE Conference on Computer Vision and Pattern Recogmtion, 2016, pp. 3150-3158.
Ding et al. "Phraseclick: Toward Achieving Flexible Interactive Segmentation by Phrase and Click." In European Conference on Computer Vision, 2020, pp. 417-435.
Dong et al. "Automatic Annotation and Segmentation of Object Instances with Deep Active Curve Network," IEEE Access 7, 2019, pp. 147501-147512.
Duan et al. "Centemet: Keypoint Triplets For Object Detection." In Proceedings Of The IEEE/CVF International Conference On Computer Vision, 2019, pp. 6569-6578.
Fan et al. "Fgn: Fully Guided Network for Few-Shot Instance Segmentation." In Proceedings of the IEEE/CVF Conference on Computer Vision and Pattern Recognition, 2020, pp. 9172-9181.
Fathi et al. "Semantic Instance Segmentation Via Deep Metric Learning." arXiv preprint arXiv:1703.10277, 2017, 9 pages.
Feichtenhofer et al. "Detect to Track and Track to Detect." In Proceedings of the IEEE International Conference on Computer Vision, 2017, pp. 3038-3046.
Fu et al. "RetinaMask: Learning to Predict Masks Improves State-of-the-Art Single-Shot Detection for Free." arXiv preprint arXiv:1901.03353, 2019.
Gulshan et al. "Geodesic Star Convexity for Interactive Image Segmentation." In 2010 IEEE Computer Society Conference on Computer Vision and Pattern Recognition, 2010, pp. 3129-3136.
Hariharan et al. "Semantic Contours from Inverse Detectors." In 2011 International Conference on Computer Vision, 2011, pp. 991-998.
He et al. "Mask R-Cnn." In Proceedings of the IEEE International Conference on Computer Vision, 2017, pp. 2961-2969.
He et al. "Deep Residual Learning for Image Recognition." In Proceedings of the IEEE Conference on Computer Vision and Pattern Recognition, 2016, pp. 770-778.
Heo et al. "Interactive Video Object Segmentation Using Global and Local Transfer Modules." In European Conference on Computer Vision, 2020, pp. 297-313.
Homayounfar et al. "Hierarchical Recurrent Attention Networks for Structured Online Maps." In Proceedings of the IEEE Conference on Computer Vision and Pattern Recognition 2018, pp. 3417-3426.
Homayounfar et al. "Dagmapper: Learning to Map by Discovering Lane Topology." In Proceedings of the IEEE/CVF International Conference on Computer Vision, 2019, pp. 2911-2920.
Homayounfar et al. "Levelset R-Cnn: A Deep Variational Method for Instance Segmentation." In European Conference on Computer Vision, 2020, pp. 555-571.
Hu et al. "Learning a Spatio-Temporal Embedding for Video Instance Segmentation." arXiv preprint arXiv:1912.08969, 2019, pp. 1-17.
Hu et al. "Maskrnn: Instance Level Video Object Segmentation." Advances in Neural Information Processing Systems 30, 2017, pp. 1-10.

(56) References Cited

OTHER PUBLICATIONS

Huang et al. "Fast Video Object Segmentation with Temporal Aggregation Network and Dynamic Template Matching." In Proceedings of the IEEE/CVF Conference on Computer Vision and Pattern Recognition, 2020, pp. 8879-8889.
Huang et al. "Mask Scoring R-Cnn." In Proceedings of the IEEE/CVF Conference on Computer Vision and Pattern Recognition, 2019, pp. 6409-6418.
Jang et al. "Interactive Image Segmentation Via Backpropagating Refinement Scheme." In Proceedings of the IEEE/CVF Conference on Computer Vision and Pattern Recognition, 2019, pp. 5297-5306.
Johnander et al. "A Generative Appearance Model for End-to-End Video Object Segmentation." In Proceedings of the IEEE/CVF Conference on Computer Vision and Pattern Recognition, 2019, pp. 8953-8962.
Kendall et al. "Multi-Task Learning Using Uncertainty to Weigh Losses for Scene Geometry and Semantics." In Proceedings of the IEEE Conference on Computer Vision and Pattern Recognition, 2018, pp. 7482-7491.
Kang et al. "Bshapenet: Object Detection and Instance Segmentation With Bounding Shape Masks." Pattern Recognition Letters 131, 2020, pp. 449-455.
Kingma et al. "Adam: A Method for Stochastic Optimization," arXiv preprint arXiv: 1412,6980, 2014, pp. 1-15.
Kirillov et al. "Instancecut: From Edges to Instances with Multicut." In Proceedings of the IEEE Conference on Computer Vision and Pattern Recognition, 2017, pp. 5008-5017.
Kirillov et al. "Pointrend: Image Segmentation as Rendering." In Proceedings of the IEEE/CVF Conference on Computer Vision And Pattern Recognition, 2020, pp. 9799-9808.
Kontogianni et al. "Continuous Adaptation for Interactive Object Segmentation by Learning From Corrections." In European Conference on Computer Vision, 2020, pp. 579-596.
Krizhevsky et al. "Imagenet Classification with Deep Convolutional Neural Networks." Advances in Neural Information Processing Systems 25, 2012.
Li et al. "Fully Convolutional Instance-Aware Semantic Segmentation." In Proceedings of the IEEE Conference on Computer Vision and Pattern Recognition, 2017, pp. 2359-2367.
Li et al. "Interactive Image Segmentation with Latent Diversity." In Proceedings of the IEEE Conference on Computer Vision and Pattern Recognition, 2018, pp. 577-585.
Liang et al. "Convolutional Recurrent Network for Road Boundary Extraction." In Proceedings of the IEEE/CVF Conference on Computer Vision and Pattern Recognition, 2019, pp. 9512-9521.
Liang et al. "Polytransform: Deep Polygon Transformer for Instance Segmentation." In Proceedings of the IEEE/CVF Conference on Computer Vision and Pattern Recognition, 2020, pp. 9131-9140.
Liang et al. "End-to-End Deep Structured Models for Drawing Crosswalks." In Proceedings of the European Conference on Computer Vision (ECCV), 2018, pp. 396-412.
Liang et al. "Proposal-Free Network for Instance-Level Object Segmentation." IEEE Transactions on Pattern Analysis and Machine Intelligence 40, No. 12, 2017, pp. 2978-2991.
Lin et al. "Video Instance Segmentation Tracking with A Modified Vae Architecture." In Proceedings of the IEEE/CVF Conference on Computer Vision and Pattern Recognition, 2020, pp. 13147-13157.
Lin et al. "Agss-Vos: Attention Guided Single-Shot Video Object Segmentation." In Proceedings of the IEEE/CVF International Conference on Computer Vision, 2019, pp. 3949-3957.
Lin et al. "Feature Pyramid Networks for Object Detection." In Proceedings of the IEEE Conference On Computer Vision and Pattern Recognition, 2017, pp. 2117-2125.
Ling et al. "Fast Interactive Object Annotation with Curve-Gen." In Proceedings of the IEEE/CVF Conference on Computer Vision and Pattern Recognition, 2019, pp. 5257-5266.
Liu et al. "Sgn: Sequential Grouping Networks for Instance Segmentation." In Proceedings of the IEEE International Conference on Computer Vision, 2017, pp. 3496-3504.
Liu et al. "Path Aggregation Network for Instance Segmentation." In Proceedings of the IEEE Conference on Computer Vision and Pattern Recognition, 2018, pp. 8759-8768.
Mais et al. "Patchperpix for Instance Segmentation." In European Conference on Computer Vision, 2020, pp. 288-304.
Majumder et al. "Content-Aware Multi-Level Guidance for Interactive Instance Segmentation." In Proceedings of the IEEE/CVF Conference on Computer Vision and Pattern Recognition, 2019, pp. 11602-11611.
Maninis et al. "Deep Extreme Cut: From Extreme Points to Object Segmentation." In Proceedings of the IEEE Conference on Computer Vision and Pattern Recognition, 2018, pp. 616-625.
Miao et al. "Memory Aggregation Networks for Efficient Interactive Video Object Segmentation." In Proceedings of the IEEE/CVF Conference on Computer Vision and Pattern Recognition, 2020, pp. 10366-10375.
Neven et al. "Instance Segmentation by Jointly Optimizing Spatial Embeddings and Clustering Bandwidth." In Proceedings of the IEEE/CVF Conference on Computer Vision and Pattern Recognition, 2019, pp. 8837-8845.
Newell et al. "Associative Embedding: End-to-End Learning for Joint Detection and Grouping." Advances in Neural Information Processing Systems 30, 2017, pp. 1-11.
Oh et al. "Fast User-Guided Video Object Segmentation by Interaction-And-Propagation Networks." In Proceedings of the IEEE/CVF Conference on Computer Vision and Pattern Recognition, 2019, pp. 5247-5256.
Oh et al. "Video Object Segmentation Using Space-Time Memory Networks." In Proceedings of the IEEE/CVF International Conference on Computer Vision, 2019, pp. 9226-9235.
Papadopoulos et al. "Extreme Clicking for Efficient Object Annotation." In Proceedings of the IEEE International Conference on Computer Vision, 2017, pp. 4930-4939.
Peng et al. "Deep Snake for Real-Time Instance Segmentation." In Proceedings of the IEEE/CVF Conference on Computer Vision and Pattern Recognition, 2020, pp. 8533-8542.
Pont-Tuset et al. "The 2017 Davis Challenge on Video Object Segmentation." arXiv preprint arXiv:1704.00675, 2017, pp. 1-6.
Qi et al. "Pointins: Point-Based Instance Segmentation." IEEE Transactions on Pattern Analysis and Machine Intelligence, 2021.
Rother et al. ""GrabCut" Interactive Foreground Extraction Using Iterated Graph Cuts." ACM Transactions on Graphics (TOG) 23, No. 3, 2004, pp. 309-314.
Shen et al. "Interactive Annotation of 3d Object Geometry Using 2d Scribbles." In European Conference on Computer Vision, 2020, pp. 751-767.
Sofiiuk et al. "F-Brs: Rethinking Backpropagating Refinement for Interactive Segmentation." In Proceedings of the IEEE/CVF Conference on Computer Vision and Pattern Recognition, 2020, pp. 8623-8632.
Teed et al. "Raft: Recurrent All-Pairs Field Transforms for Optical Flow." In European Conference on Computer Vision, 2020, pp. 402-419.
Tian et al. "Conditional Convolutions for Instance Segmentation." In European Conference on Computer Vision, 2020, pp. 282-298.
Uhrig et al. "Pixel-Level Encoding and Depth Layering for Instance-Level Semantic Labeling." In German Conference on Pattern Recognition, 2016, pp. 14-25.
Vaswani et al. "Attention is All You Need." Advances in Neural Information Processing Systems 30, 2017, pp. 1-11.
Ventura et al. "Rvos: End-to-End Recurrent Network for Video Object Segmentation." In Proceedings of the IEEE/CVF Conference on Computer Vision and Pattern Recognition, 2019, pp. 5277-5286.
Wang et al. "Zero-Shot Video Object Segmentation Via Attentive Graph Neural Networks." In Proceedings of the IEEE/CVF International Conference on Computer Vision, 2019, pp. 9236-9245.
Wang et al. "Centermask: Single Shot Instance Segmentation with Point Representation." In Proceedings of the IEEE/CVF Conference on Computer Vision and Pattern Recognition, 2020, pp. 9313-9321.
Wang et al. "Object Instance Annotation with Deep Extreme Level Set Evolution." In Proceedings of the IEEE/CVF Conference on Computer Vision and Pattern Recognition, 2019, pp. 7500-7508.

(56) References Cited

OTHER PUBLICATIONS

Wang et al. "Ranet: Ranking Attention Network for Fast Video Object Segmentation." In Proceedings of the IEEE/CVF International Conference on Computer Vision, 2019, pp. 3978-3987.
Wei et al. "Point-Set Anchors for Object Detection, Instance Segmentation and Pose Estimation." In European Conference on Computer Vision, 2020, pp. 527-544.
Wolf et al. "The Semantic Mutex Watershed for Efficient Bottom-Up Semantic Instance Segmentation." In European Conference on Computer Vision, 2020, pp. 208-224.
Wu et al., "Particularity Beyond Commonality: Unpaired Identity Transfer with Multiple References." In European Conference on Computer Vision, 2020, pp. 456-473.
Xie et al. "Polarmask: Single Shot Instance Segmentation with Polar Representation." In Proceedings of the IEEE/CVF Conference on Computer Vision and Pattern Recognition, 2020, pp. 12193-12202.
Xiong et al. "Upsnet: A Unified Panoptic Segmentation Network." In Proceedings of the IEEE/CVF Conference on Computer Vision and Pattern Recognition, 2019, pp. 8818-8826.
Xu et al. "Deep Interactive Object Selection." In Proceedings of the IEEE Conference on Computer Vision and Pattern Recognition, 2016, pp. 373-381.
Xu et al. "Youtube-vos: A Large-Scale Video Object Segmentation Benchmark." arXiv preprint arXiv:1809.03327, 2018, pp. 1-10.
Xu et al. "Explicit Shape Encoding for Real-Time Instance Segmentation." In Proceedings of the IEEE/CVF International Conference on Computer Vision, 2019, pp. 5168-5177.
Xu et al. "Segment as Points for Efficient Online Multi-Object Tracking and Segmentation." In European Conference on Computer Vision, 2020, pp. 264-281.
Zhou et al. "Enhanced Memory Network for Video Segmentation." In Proceedings of the IEEE/CVF International Conference on Computer Vision Workshops, 2019, 4 pages.
Yang et al. "Dense Reppoints: Representing Visual Objects with Dense Point Sets." In European Conference on Computer Vision, 2020, pp. 227-244.
Yuan et al. "Deep variational instance segmentation." Advances in Neural Information Processing Systems 33, 2020, pp. 4811-4822.
Zeng et al. "Dmm-Net: Differentiable Mask-Matching Network for Video Object Segmentation." In Proceedings of the IEEE/CVF International Conference on Computer Vision, 2019, pp. 3929-3938.
Zhang et al. "Fast Video Object Segmentation Via Dynamic Targeting Network." In Proceedings of the IEEE/CVF International Conference on Computer Vision, 2019, pp. 5582-5591.
Zhang et al. "Mask Encoding for Single Shot Instance Segmentation." In Proceedings of the IEEE/CVF Conference on Computer Vision and Pattern Recognition, 2020, pp. 10226-10235.
Zhang et al. "Instance-Level Segmentation for Autonomous Driving with Deep Densely Connected Mrfs." In Proceedings of the IEEE Conference on Computer Vision and Pattern Recognition, 2016, pp. 669-677.
Zhang et al. "Monocular Object Instance Segmentation and Depth Ordering with Cnns." In Proceedings of the IEEE International Conference on Computer Vision, 2015, pp. 2614-2622.
Kim et al., "Instance Segmentation and Object Detection with Bounding Shape Masks", arXiv:1810.10327v1, Oct. 15, 2018, 8 pages.
Yang et al, "Video Instance Segmentation", International Conference on Computer Vision, Oct. 27-Nov. 2, 2019, Seoul, South Korea, pp. 5187-5196.

\* cited by examiner

SYSTEMS AND METHODS FOR VIDEO OBJECT SEGMENTATION

RELATED APPLICATION

The present application is based on and claims the benefit of U.S. Provisional Patent Application No. 63/114,811 having a filing date of Nov. 17, 2020, which is incorporated by reference herein in its entirety.

BACKGROUND

An autonomous platform can process data to perceive an environment through which the platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Aspects and advantages of embodiments of the present disclosure will be set forth in part in the following description, or may be learned from the description, or may be learned through practice of the embodiments. The present disclosure describes a system for annotating objects across a number of image frames in a video sequence. The system enables an annotator to identify objects within the first image frame of a video sequence by clicking anywhere within the object. Each click can be treated as a separate object. The system processes the first image frame and a second, subsequent, image frame to assign each pixel of the second image frame to either (1) one of the objects identified in the first image frame; or (2) the background. The system refines the resulting object masks (e.g., a collection of pixels assigned to each object) for the second image frame using a recurrent attention module based on contextual features extracted from the second image frame. The system can receive additional user input for the second image frame if new objects are introduced in the second image and use the additional input, in combination with the object masks for the second image frame, to determine object masks for a third, subsequent, image frame in the video sequence. The system can repeat this process for each image frame in the video sequence to generate object segmentations across a sequence of images.

The system can include a machine-learned model that learns to generate a plurality of object segmentations for a second image based on an input of (i) two sequential images and (ii) user input to the first image of the two sequential images that identifies objects within the first image. To do so, the machine-learned model can process both images to create respective feature maps for each image. The machine-learned model samples the feature map of the first image to generate feature vectors corresponding to each object identified by the user input. The feature vectors can be compared to the feature map of the second image to determine a correlation volume for the second image. The correlation volume includes a plurality of correlation scores for each pixel of the second image. Each correlation score identifies a probability that the respective pixel corresponds to one of the identified objects or the background. The machine-learned model can generate a first coarse segmentation instance for each object identified by the user input based on the correlation volume by assigning each pixel in the second image to the object (or background) associated with the highest correlation score. The machine-learned model can refine the correlation volume using a recurrent attention module based on contextual features extracted from the second image. The refined correlation volume can be used to generate a refined segmentation instance for each object identified by the user input.

This process can be extended to a third, subsequent, image in a video sequence based on the refined correlation volume from the second image and additional user input that identifies new objects in the second image. To do so, the machine-learned model can update the correlation volume for the second image based on the additional user input and obtain segmentation masks for the second image based on the updated correlation volume. The machine-learned model can obtain a set of feature vectors corresponding to each of the objects identified by the user input and the additional user input using the segmentation masks (e.g., each feature vector includes features from the highest scoring pixels corresponding to a respective object). The machine-learned model compares a feature map for the third image to the set of feature vectors to obtain a correlation volume for the third image in the manner described above.

Aspects of the present disclosure can provide a number of technical improvements to robotics, machine-learning, and object segmentation technologies. The improved object segmentation techniques described herein can offer a solution to the technical problem of accurately segmenting full sequences of images. By doing so, the systems and methods of the present disclosure provide an improved approach for annotating large scale training datasets for training machine-learning models. This, in turn, can increase the performance of machine-learning models by enabling the generation of accurately labeled training datasets covering a wide range of diverse scenarios for training the machine-learning models.

The systems and methods described herein can accumulate and utilize newly available information such as key points identified by an annotator to provide practical improvements to robotic, machine-learning, and object segmentation technologies. Unlike previous object segmentation techniques, the systems and methods described herein enable an annotator to identify an object with a single point anywhere within an object. Information obtained based on these single points can then be propagated across each image frame in a video sequence. In this manner, the systems and methods described herein can increase the speed, efficiency, and scalability of object segmentation. This, in turn, improves the functioning of robotic and machine-learning technologies by increasing the diversity of the training data available for training, testing, and/or verifying machine-learning models and/or other robotic algorithms. Ultimately, the techniques disclosed herein result in more accurate, robust, and efficient object segmentation techniques, thereby improving training techniques and on road performance for a vast array of robotic or autonomous vehicle technologies.

As an example, the present disclosure provides a computer-implemented method. The method includes receiving a first image, a second image, and user input indicative of a position within the first image. The method includes processing the first image and the second image with a machine-learned feature extraction model to generate a first feature map for the first image and a second feature map for the second image. The method includes determining a compatibility score for a pixel of the second image based on the first feature map, the second feature map, and the user input. The compatibility score is indicative of a probability that the pixel of the second image corresponds to a first object represented at the position within the first image. The method includes generating a segmentation mask for the first object within the second image based on the compatibility score for the pixel of the second image.

In some implementations, the method includes sampling, based on the user input, the first feature map to generate an object feature vector for the first object. The method includes determining the compatibility score for the pixel of the second image based on a comparison between the object feature vector and the second feature map.

In some implementations, the user input identifies coordinates within the first image. The object feature vector corresponds to the coordinates within the first image.

In some implementations, the method includes generating a feature matrix based on the object feature vector. The feature matrix includes the object feature vector, one or more additional object feature vectors for one or more additional objects represented by the first image, and a background feature vector. The method includes determining the compatibility score for the pixel of the second image based on the feature matrix.

In some implementations, the method includes determining a pixel feature vector from the second feature map. The pixel feature vector corresponds to the pixel of the second image. The method includes generating a correlation volume for the second image based on a dot product between the pixel feature vector and each row of the feature matrix. The correlation volume for the second image is indicative of a respective compatibility score for the object feature vector, the one or more additional object feature vectors, and the background feature vector. The method includes generating the segmentation mask for the first object within the second image based on the correlation volume for the second image.

In some implementations, the method includes generating a correlation volume for the second image from the compatibility score for the pixel of the second image and a plurality of additional compatibility scores for the pixel of the second image.

In some implementations, the method includes iteratively processing the correlation volume for the second image with a recurrent attention module to obtain a refined correlation volume for the second image. The method includes generating the segmentation mask for the first object within the second image based on the refined correlation volume for the second image.

In some implementations, processing the correlation volume for the second image with the recurrent attention module includes processing the second image with a machine-learned contextual model to generate a contextual feature map for the second image; and generating the refined correlation volume for the second image based on the correlation volume for the second image and the contextual feature map.

In some implementations, the feature extraction model includes a siamese encoder-decoder network. In some implementations, processing the second image with the machine-learned contextual model to generate the contextual feature map for the second image includes: processing the second image with an encoder network of the siamese encoder-decoder network to extract a plurality of features for the second image; and processing the plurality of features for the second image with the machine-learned contextual model to generate the contextual feature map for the second image.

In some implementations, the method includes receiving additional user input indicative of a position within the second image. The method includes generating an updated correlation volume for the second image based on the refined correlation volume for the second image and the additional user input. The method includes generating a second segmentation mask for a second object within the second image based on the updated correlation volume for the second image.

In some implementations, the first image is associated with a first time and the second image is associated with a second time subsequent to the first time.

In some implementations, the method includes receiving a third image associated with a third time subsequent to the second time. The method includes generating a correlation volume for the third image based on the updated correlation volume for the second image, the second feature map, and the additional user input.

In some implementations, the segmentation mask for the first object within the second image is indicative of a plurality of pixels of the second image that correspond to the first object. In some implementations, generating the correlation volume for the third image includes identifying a subset of the plurality of pixels associated with a relative correlation score above a threshold correlation score; generating a cumulative object feature vector for the first object based on the subset of the plurality of pixels and the second feature map of the second image; and generating the correlation volume for the third image based on the cumulative object feature vector for the first object.

In some implementations, generating the correlation volume for the third image based on the cumulative object feature vector for the first object includes processing the third image with the machine-learned feature extraction model to generate a third feature map for the third image; and determining a compatibility score for a pixel of the third image based on a comparison between the cumulative object feature vector and the third feature map.

As another example, in an aspect, the present disclosure provides a computing system including one or more processors and one or more computer-readable mediums storing instructions that when executed by the one or more processors cause the computing system to perform operations. The operations include receiving a first image, a second image, and user input indicative of a position within the first image. The operations include processing the first image and the second image with a machine-learned feature extraction model to generate a first feature map for the first image and a second feature map for the second image. The operations include determining a compatibility score for a pixel of the second image based on the first feature map, the second feature map, and the user input. The compatibility score is indicative of a probability that the pixel of the second image corresponds to a first object represented at the position within the first image. The operations include generating a segmentation mask for the first object within the second image based on the compatibility score for the pixel of the second image.

In some implementations, determining a compatibility score for the pixel of the second image based on the first feature map, the second feature map, and the user input includes sampling, based on the user input, the first feature map to generate an object feature vector for the first object; and determining the compatibility score for the pixel of the second image based on a comparison between the object feature vector and the second feature map.

In some implementations, determining the compatibility score for the pixel of the second image based on the first feature map, the second feature map, and the user input includes generating a feature matrix based on the object feature vector; and determining the compatibility score for the pixel of the second image based on the feature matrix. The feature matrix includes the object feature vector, one or more additional object feature vectors for one or more additional objects represented by the first image, and a background feature vector.

In some implementations, determining the compatibility score for the pixel of the second image based on the first feature map, the second feature map, and the user input includes determining a pixel feature vector from the second feature map. The pixel feature vector corresponds to the pixel of the second image. In some implementations, determining the compatibility score for the pixel of the second image based on the first feature map, the second feature map, and the user input includes generating a correlation volume for the second image based on a dot product between the pixel feature vector and each row of the feature matrix. The correlation volume for the second image is indicative of a respective compatibility score for the object feature vector, the one or more additional object feature vectors, and the background feature vector. In some implementations, determining the compatibility score for the pixel of the second image based on the first feature map, the second feature map, and the user input includes generating the segmentation mask for the first object within the second image based on the correlation volume for the second image.

In some implementations, generating the segmentation mask for the first object within the second image based on the compatibility score for the pixel of the second image includes processing the second image with a machine-learned contextual model to generate a contextual feature map for the second image; and generating a refined correlation volume for the second image based on the correlation volume for the second image and the contextual feature map.

As yet another example, in an aspect, the present disclosure provides one or more tangible, non-transitory, computer readable media that store instructions that when executed by one or more processors cause the one or more processors to perform operations. The operations include receiving a first image, a second image, and user input indicative of a position within the first image. The operations include processing the first image and the second image with a machine-learned feature extraction model to generate a first feature map for the first image and a second feature map for the second image. The operations include determining a compatibility score for a pixel of the second image based on the first feature map, the second feature map, and the user input. The compatibility score is indicative of a probability that the pixel of the second image corresponds to a first object represented at the position within the first image. The operations include generating a segmentation mask for the first object within the second image based on the compatibility score for the pixel of the second image.

Other example aspects of the present disclosure are directed to other systems, methods, vehicles, apparatuses, tangible non-transitory computer-readable media, and devices for generating data (e.g., annotated images, object segmentations, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented within other robotic and computing systems. Throughout the present application various methods and operations will be described. Those of ordinary skill in the art, using the disclosures provided herein, will understand that the elements of any of the methods, operations, or claims discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of steps or operations. For instance, letter identifiers such as (a), (b), (c), . . . (i), (ii), (iii), . . . , etc. may be used to illustrate method steps or operations. Such identifiers are provided for the ease of the reader and do not denote a particular order of steps or operations. An operation illustrated by a list identifier of (a), (i), etc. can be performed before, after, and/or in parallel with another operation illustrated by a list identifier of (b), (ii), etc.

Figure 1:
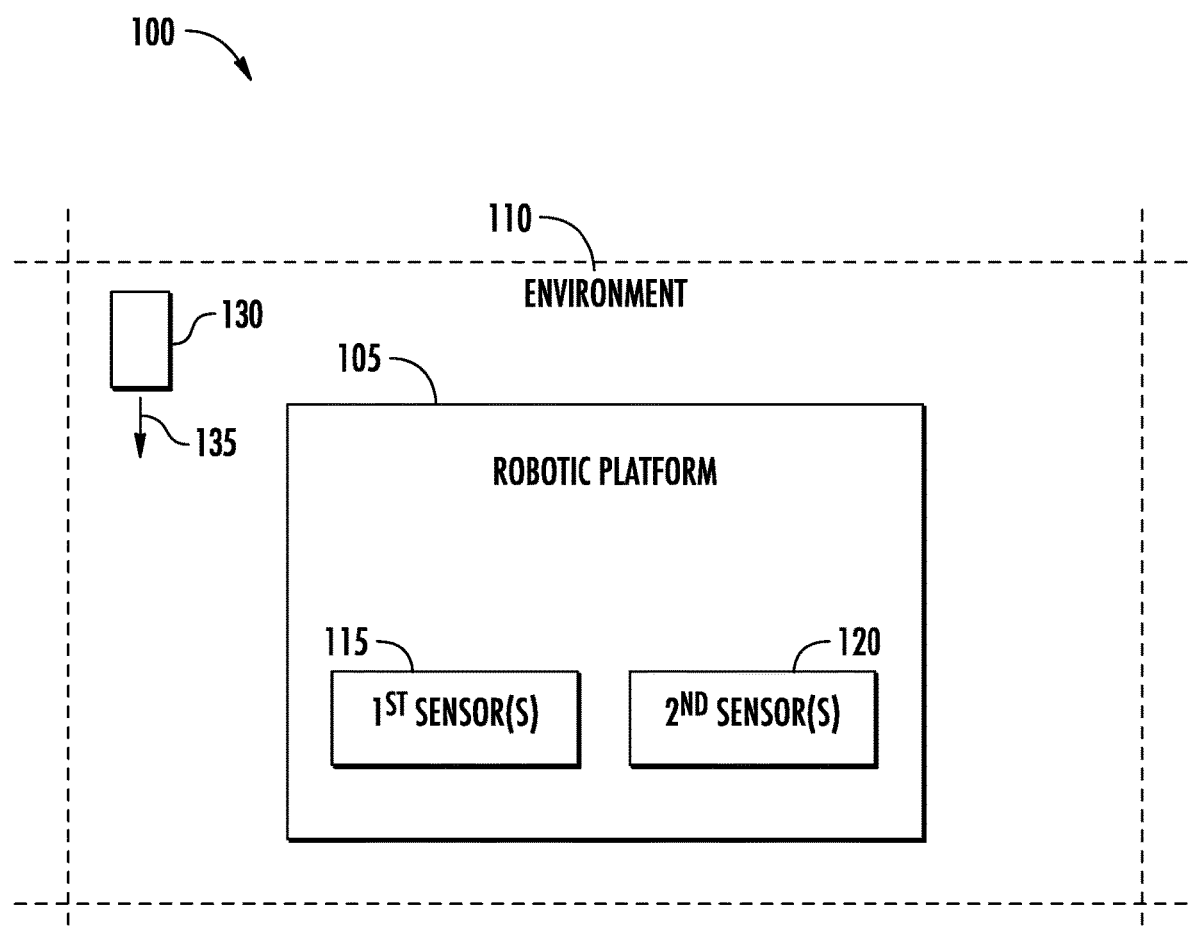
FIG. 1 is a block diagram of an operational scenario, according to some implementations of the present disclosure.

With reference now to FIGS. 1-10, example embodiments of the present disclosure will be discussed in further detail. FIG. 1 is a block diagram of an operational scenario 100, according to some implementations of the present disclosure. The operational scenario 100 includes a autonomous platform 105 and an environment 110. The environment 110 can be external to the autonomous platform 105. The autonomous platform 105, for example, can operate within the environment 110. The environment 110 can include an indoor environment (e.g., within one or more facilities) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.). The environment 110 can include a real-world environment or a simulated environment. A simulated environment, for example, can include a generated environment modelled after one or more real-world scenes and/or scenarios. The operation of the autonomous platform 105 can be simulated within a simulated environment by providing data indicative of the simulated environment (e.g., historical data associated with a corresponding real-world scene, data generated based on one or more heuristics, etc.) to one or more systems of the autonomous platform 105.

The environment 110 can include one or more dynamic object(s) 130 (e.g., simulated objects, real-world objects, etc.). The dynamic object(s) 130 can include any number of moveable objects such as, for example, one or more pedestrians, animals, vehicles, etc. The dynamic object(s) 130 can move within the environment according to one or more trajectories 135. The autonomous platform 105 can include one or more sensor(s) 115, 120. The one or more sensors 115, 120 can be configured to generate or store data descriptive of the environment 110 (e.g., one or more static or dynamic object(s) 130 therein). The sensor(s) 115, 120 can include one or more Light Detection and Ranging (LiDAR) systems, one or more Radio Detection and Ranging (RA-DAR) systems, one or more cameras (e.g., visible spectrum cameras or infrared cameras), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LiDAR device, etc.).

The autonomous platform 105 can include any type of platform configured to operate within the environment 110. For example, the autonomous platform 105 can include one or more different type(s) of vehicle(s) configured to perceive and operate within the environment 110. The vehicles, for example, can include one or more autonomous vehicle(s) such as, for example, one or more autonomous trucks. By way of example, the autonomous platform 105 can include an autonomous truck including an autonomous tractor coupled to a cargo trailer. In addition, or alternatively, the autonomous platform 105 can include any other type of vehicle such as one or more aerial vehicles, ground-based vehicles, water-based vehicles, space-based vehicles, etc.

Figure 2:
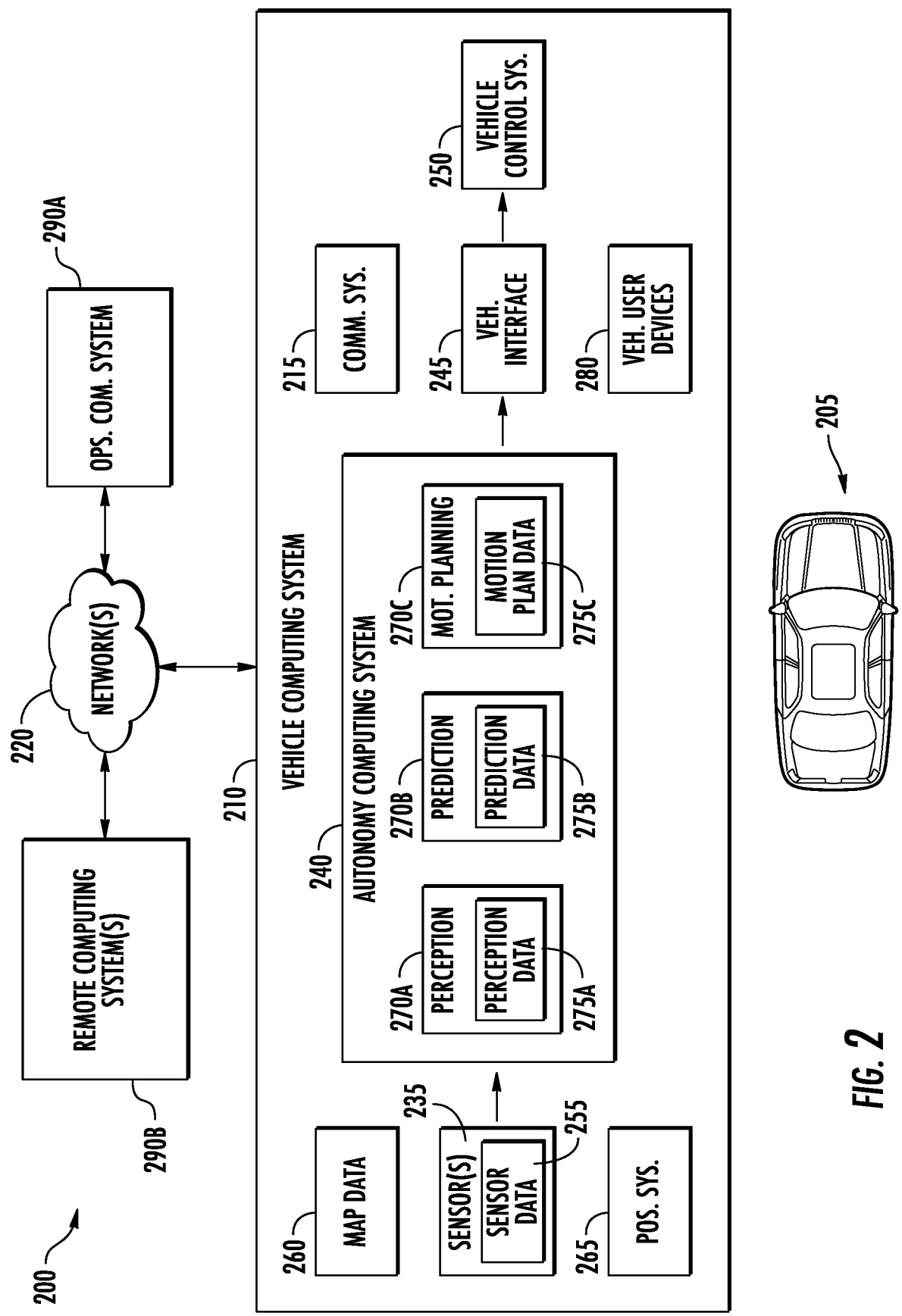
FIG. 2 is a block diagram of a system, according to some implementations of the present disclosure.

FIG. 2 is a block diagram of a system 200, according to some implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. The vehicle computing system 210 can be an autonomous vehicle control system for an autonomous vehicle. The vehicle computing system 210 can obtain sensor data 255 from a sensor system 235 (e.g., sensor(s) 115, 120 of FIG. 1) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, vertical take-off and lift (VTOL) aircraft, etc.). The vehicle 205 can be a lightweight electric vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 or also omitted from remote control of the vehicle 205. In some implementations, a human operator can be included in the vehicle 205.

The vehicle 205 can be configured to operate in a plurality of operating modes. The vehicle 205 can be configured to operate in a fully autonomous (e.g., self-driving) operating mode in which the vehicle 205 is controllable without user input (e.g., can drive and navigate with no input from a human operator present in the vehicle 205 or remote from the vehicle 205). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system 290B (e.g., of a vehicle provider or service entity associated with the vehicle 205) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set on-board or near the vehicle 205. For example, the vehicle computing system 210 can automatically determine when and where the vehicle 205 is to enter, change, maintain, etc. a particular operating mode (e.g., without user input). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users to coordinate a vehicle service provided by the vehicle 205. To do so, the operations computing system 290A can communicate with the one or more remote computing system(s) 290B or the vehicle 205 through one or more communications network(s) including the network(s) 220. The network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals) with one or more devices including the operations computing system 290A and the vehicle 205 through the network 220.

The one or more remote computing system(s) 290B can include one or more computing devices such as, for example, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 210), etc. In some implementations, the remote computing device(s) 290B can be associated with a service entity that coordinates and manages a vehicle service. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 205 including a location (e.g., a latitude and longitude), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the vehicle 205. For example, the computing device(s) can be located on or within the vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for obtaining and/or generating a training dataset with a plurality of object segmentations.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 210 can use the communications system 215 to communicate with one or more computing device(s) that are remote from the vehicle 205 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 205 or among computing systems.

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain sensor data (e.g., a portion of sensor data 255) indicative of one or more dynamic objects within an environment of the vehicle 205.

More generally, the sensor(s) 235 can be configured to acquire sensor data 255. The sensor(s) 235 can be external sensors configured to acquire external sensor data. This can include sensor data associated with the surrounding environment (e.g., in a real-world or simulated environment) of the vehicle 205. The surrounding environment of the vehicle 205 can include/be represented in the field of view of the sensor(s) 235. For instance, the sensor(s) 235 can acquire images or other data of the environment outside of the vehicle 205 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 205 including a front side, rear side, left side, right side, top, or bottom of the vehicle 205. The sensor data 255 can include image data (e.g., 2D camera data, video data, etc.), RADAR data, LIDAR data (e.g., 3D point cloud data, etc.), audio data, or other types of data. The vehicle 205 can also include other sensors configured to acquire data associated with the vehicle 205. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, or below the vehicle 205, etc. The sensor data 255 can be indicative of locations associated with the object(s) within the surrounding environment of the vehicle 205 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing system(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curbs); the location and direction of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indication of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data 260 can be limited to geographic area(s) or operating domains in which the vehicle 205 (or autonomous vehicles generally) may travel (e.g., due to legal/regulatory constraints, autonomy capabilities, or other factors).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270A, using a perception system, etc.) can process the sensor data 255, the map data 260, etc. to obtain perception data 275A. The vehicle computing system 210 can generate perception data 275A that is indicative of one or more states (e.g., current or past state(s)) of one or more objects that are within a surrounding environment of the vehicle 205. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict/forecast a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the portion of autonomy computing system 240 dedicated to prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points, footprints, etc. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The portion of autonomy computing system 240 dedicated to motion planning function 270C can generate cost data associated with such trajectories. In some implementations, one or more of the predicted motion trajectories or perceived objects may not ultimately change the motion of the vehicle 205 (e.g., due to an overriding factor). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., next several seconds, etc.). Moreover, a new motion plan may include a new planned vehicle motion trajectory. Thus, in some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or stored on-board the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, or smartphone) can be viewable by a user of the vehicle 205 that is located in the front of the vehicle 205 (e.g., driver's seat, front passenger seat). Additionally, or alternatively, a display device can be viewable by a user of the vehicle 205 that is located in the rear of the vehicle 205 (e.g., a back passenger seat). The user device(s) associated with the display devices can be any type of user device such as, for example, a table, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be trained through one or more machine-learned techniques. For instance, the machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system (e.g., the operations computing system 290A, etc.) over training data stored in a training database. The training data can include simulation data indicative of a plurality of environments and/or testing objects/object trajectories at one or more times. The simulation data can be indicative of a plurality of dynamic objects within the environments. In some implementations, the training data can include a plurality of environments previously recorded by the vehicle 205. For instance, the training data can be indicative of a plurality of dynamic objects previously observed or identified by the vehicle 205.

As one example, the training data can include a plurality of two-dimensional and/or three-dimensional images representative of a previously observed environment over time. The previously observed environments over time can include one or more dynamic and/or static objects. The objects can be annotated to provide labelled training data with ground truths for supervised training of the one or more machine-learned models. The present disclosure is directed to improved techniques for annotating the plurality of two-dimensional and/or three-dimensional images with labels indicative of the position and space (e.g., segmentation masks, etc.) occupied by a number of different objects within each of the plurality of two-dimensional and/or three-dimensional images.

Figure 3:
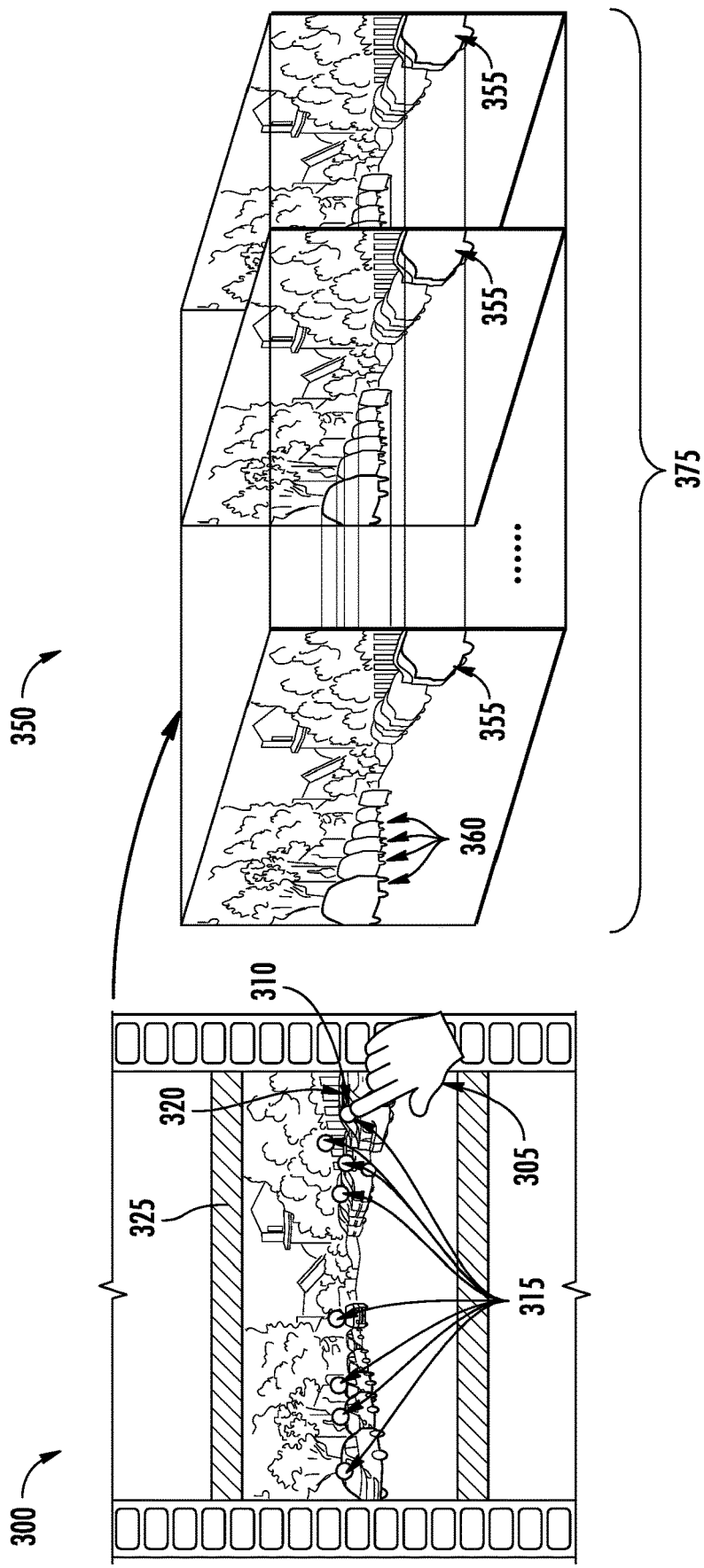
FIG. 3 depicts an example input and output of an example system for annotating a sequence of images, according to some implementations of the present disclosure.

For instance, FIG. 3 depicts an example input 300 and an example output 350 of an example system for annotating a sequence of images 375, according to some implementations of the present disclosure. The example system can include a video segmentation model that is configured to generate the output 350. The output 350 may include a plurality of segmentation masks 360 across a sequence of images 375. The output 350 can be generated based on the input 300 that includes user input 305 to at least a first image 325 of the sequence of images 375. The user input 305, for example, can be a touch input, a click input, and/or any other manual input that specifies a position within the first image 325. For instance, the user input 305 can identify coordinates 310 within the first image 325. The coordinates 310 can be associated with a first object 320 within the first image 325. For example, the first image 325 can include a representation of the first object 320 within an environment. The coordinates 310 can be positioned within the representation of the first object 320. Using the user input 305 indicative of a position within a representation of the first object 320 in the first image 325, the video segmentation model of the present disclosure can output a segmentation mask 355 for the first object 320 across the sequence of images 375. In this manner, the video segmentation model can generate a segmentation mask 355 for a first object 320 across a sequence of images 375 given a single user input 305 (e.g., click) by an annotator anywhere within the first object 320 as represented by the first image 325.

In some implementations, the user input 305 can identify a plurality of key points 315 within the first image 325. The plurality of key points 315 can include, for example, the coordinates 310 and one or more additional coordinate pairs associated with one or more additional objects represented by the first image 325. Each key point 315 can specify coordinates indicative of a respective position within the first image 325. The respective position identified by each key point 315 can be anywhere within a respective object (e.g., such as the first object 320) represented by the first image 325. The video segmentation model can generate respective object segmentation masks 360 for each respective object identified by the plurality of key points 315 across the sequence of images 375.

This can, in turn enable video segmentation at scale using minimal user input. Video object segmentation, for example, can aim to identify all countable objects in the video and produce segmentation masks 360 (e.g., a sequence of object segmentation masks) for each of them. By detecting the pixels of unique objects in space and time, a training dataset can be generated with a better understanding of an environment. The single click approach for object segmentation across a sequence of images 375 (e.g., a video) can enable an annotator to identify an arbitrary point (e.g., such as the key points 315) within an image (e.g., first image 325) so long as it lies within an object, significantly relieving the cognitive load for annotation. In addition, the user input 305 (e.g., click) can be easy and fast to annotate, allowing for video annotation at scale.

Figure 4:
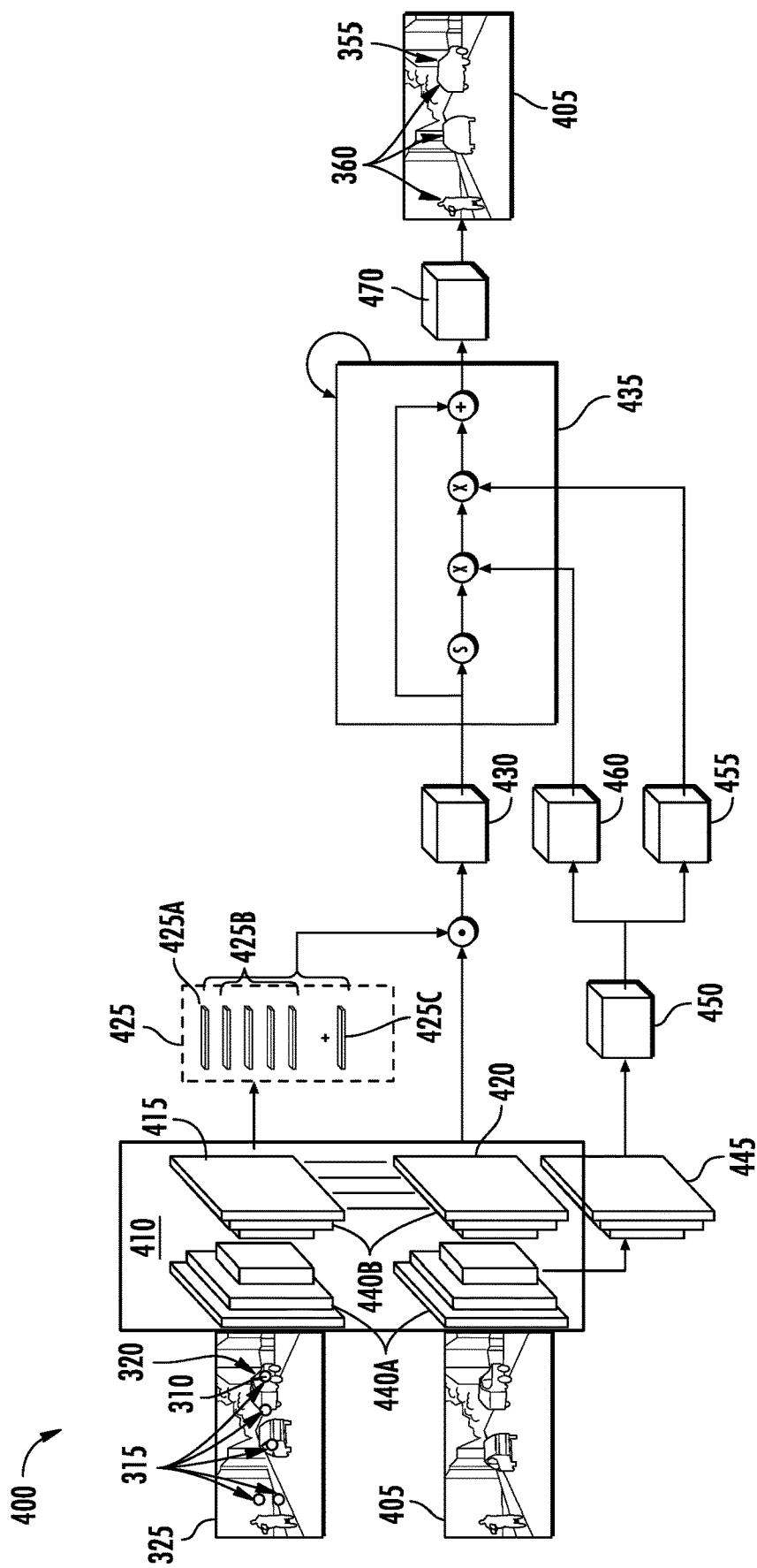
FIG. 4 is a block diagram of an example system for annotating a sequence of images, according to some implementations of the present disclosure.

FIG. 4 is an example system 400 for annotating a sequence of images, according to some implementations of the present disclosure. The system 400 can include one or more machine-learned models. The one or more machine-learned models, for example, can include a video segmentation model configured to process the inputs 300 to generate the outputs 350 as described with reference to FIG. 3.

The system 400 (e.g., the video segmentation model) can receive a first image 325, a second image 405, and user input indicative of at least one position (e.g., coordinates 310) within the first image 325. The user input, for example, can be indicative of a plurality of key points 315 as described with reference to FIG. 3. The first image 325 and the second image 405 can include sequential image frames in a sequence of images taken from a video. The sequence of images can include two image frames, three image frames, ten image frames, twenty image frames, thirty image frames, and/or any other number of image frames. Each image in the sequence of images can be associated with a time and/or order relative to the other images in the sequence of images. For instance, the first image 325 can be associated with a first time and the second image 405 can be associated with a second time subsequent to the first time. The sequence of images can include a plurality of red, blue, green ("RGB") images (e.g., denoted as $I_t \in ^{3 \times H \times W^T}_{t=1}$)) from a video. In some implementations, the sequence of images can include a plurality of high-definition images of an original 1024× 2048 resolution. It should be noted, however, that a person of ordinary skill in the art will appreciate that a sequence of images can include images of any resolution.

The first image 325 and the second image 405 can be descriptive of a respective environment and a plurality of objects (e.g., such as first object 320) within the respective environment. In some implementations, the respective environment of the second image 405 can be the same respective environment of the first image 325 at a time subsequent to the first image 325. For instance, each of the images in the sequence of images can be descriptive of the same environment at various times over a time period. Although the environment is the same across each image of the sequence of images, the plurality of objects and/or the position of the objects within the environment can change over time. In such a case, the sequence of images can be descriptive of a respective environment with a plurality of different objects positioned at different locations within the respective environment at one or more times over the time period.

In some implementations, the respective environment of the second image 405 can be different from the respective environment of the first image 325. For instance, the sequence of images can be tied to a movement of an autonomous platform. As an example, the sequence of images can be recorded by sensors of the autonomous platform as the autonomous platform travels along a road segment. Although the environment may change across one or more of the sequence of images, the plurality of objects and/or the position of the objects within the environment can overlap at different environments over time. In such a case, the sequence of images can be descriptive of a plurality of environments with a plurality of overlapping objects positioned at one or more locations within each respective environment at one or more times over the time period.

The system 400 can receive a user input indicative of at least one position (e.g., coordinates 310) within the first image 325 that can identify a position of a first object 320 within an environment represented by the first image 325. For instance, an annotator can provide one click, point, touch, or the like per object in the first image 325 that appears in the sequence of images. The user input can be at any arbitrary position (e.g., coordinates 310) inside the first object 320. As described above, the user input can be indicative of coordinates 310 within a respective image. For instance, the user input coordinates at time t can be denoted as $P_t = p_{t,n}{}_{n=1}^{N_t}$ and by $N = \Sigma N_t$ the total number of identified points (e.g., key points 315) in each image of the sequence of images.

If the first object 320 disappears (e.g., due to occlusion) the annotator can provide additional user input to identify the first object 320 within a subsequent image (e.g., image 405) of the sequence of images once it reappears in the sequence of images. Given the user input (e.g., user input 305 indicative of coordinates 310 and/or key points 315) for the N objects, the system 400 can obtain corresponding segmentation masks 360 for the objects at each image frame in the video (e.g., denoted by $M_t \in ^{H \times W^T}_{t=1}$). By way of example, at a pixel position (e.g., coordinates 310 denoted (i,j)) at time t the segmentation masks 360 can include $M_t(i,j) \in 0, 1, \ldots, N$ where the label $n \in 1, \ldots, N$ corresponds to one of the N objects specified by the annotator and the label 0 represents the background.

The system 400 can receive a pair of consecutive images 325, 405 (e.g., denoted $I_t$ and $I_{t+1}$) and extend the observations made using the pair of images 325, 405 to the full sequence of images (e.g., denoted $I_{t=1}^{T}$). For example, given user input to the first image 325 (e.g., single point clicks $P_t = p_{t,n_{t=1}}^{N_t}$ all the visible objects in $I_t$), the system 400 can generate segmentation masks 360 (e.g., denoted $M_{t+1}$) for objects in the second image 405 (e.g., denoted $I_{t+1}$). The segmentation masks 360 for the second image 405 can be used to generate segmentation masks for objects in the remaining images of the sequence of images as described in further detail herein.

The system 400 (e.g., the video segmentation model) can include one or more machine-learned models configured to perform one or more functions for object segmentation. For example, the system 400 can obtain deep spatio-temporal features on top of the first image 325 (e.g., denoted $I_t$) and the second image 405 (e.g., denoted $I_{t+1}$) using a first machine-learned model (e.g., a machine-learned feature extraction model 410). For instance, the system 400 can process the first image 325 and the second image 405 with a machine-learned feature extraction model 410 to generate a first feature map 415 for the first image 325 and a second feature map 420 for the second image 405. The system 400 can input the first image 325 (e.g., $I_t$) and the second image 405 (e.g., $I_{t+1}$) to the feature extraction model 410 (e.g., a siamese encoder-decoder network) to receive the first feature map 415 for the first image 325 and the second feature map 420 for the second image 405 as an output of the feature extraction model 410.

The feature extraction model 410 can include a siamese encoder-decoder network including an encoder network 440A and a decoder network 440B (e.g., a spatio-temporal decoder network). The encoder network 440A can include a two-dimensional residual network. By way of example, the encoder network 440A can include a deep convolutional neural network (and/or a neural network with skip connections, etc.) trained to output a feature map for an input image (e.g., first image 345, second image 405, etc.). The deep convolutional neural network architecture can offer increased accuracy and applicability of the resulting features to object segmentation. For instance, the encoder network 440A can output a feature map that can be used to segment objects at multiple scales to achieve better semantic segmentation performance compared to other object segmentation models.

Additionally or alternatively, the decoder network 440B can include a feature pyramid network augmented with temporal connections to aggregate the features across time. A first feature map 415 (e.g., a down-sampled feature map) for the first image 325 (e.g., denoted $F_t$) and second feature map 420 (e.g., a down-sampled feature map) for the second image 405 (e.g., denoted $F_{t+1} \in \mathbb{R}^{D \times H/4 \times W/4}$) can be output by the decoder network 440B. The feature maps 415, 420 can include information about the object masks and also their association in time and can be used to construct a correlation volume 430 between the pixels of the second image 405 and the key points 315 of the number of objects in the first image 325 or the background.

The system 400 can determine a compatibility score for a pixel of the second image 405 based on the first feature map 415, the second feature map 420, and the user input (e.g., user input 305 indicative of coordinates 310 and/or key points 315). The compatibility score can be indicative of a probability that the pixel of the second image 405 corresponds to the first object 320 represented at the position (e.g., coordinates 310) within the first image 325. By way of example, the system 400 can sample, based on the user input indicative of the position (e.g., coordinates 310), the first feature map 415 to generate an object feature vector 425A for the first object 320. The object feature vector 425A, for example, can correspond to the coordinates 310 within the first image 325. The system 400 can determine the compatibility score for the pixel of the second image 405 based on a comparison between the object feature vector 425A and the second feature map 420. The system 400 can generate the segmentation mask 355 for the first object 320 within the second image 405 based on the compatibility score for the pixel of the second image 405.

By way of example, the system 400 can generate a compatibility score for each pixel of the second image 405 and each object identified by the plurality of key points 315, respectively. For example, given user input indicative of a plurality of key points 315, the system 400 can sample instance features (e.g., represented by feature matrix 425) from the first feature map 415 and fuse one or more of the instance features of feature matrix 425 with second instance features of the second feature map 420 to construct the correlation volume 430. The correlation volume 430 can score the compatibility of each pixel in the second image 405 to an object in the first image 325 as specified by the key points 315 or to the background of the first image 325.

For example, the system 400 can generate the correlation volume 430 for the second image 405 from the compatibility score for the pixel of the second image 405 and a plurality of additional compatibility scores for the pixel of the second image 405 and each of the other pixels of the second image 405. To do so, the system 400 can generate a feature matrix 425 based on the object feature vector 425A. The feature matrix 425 can include instance features corresponding to the object feature vector 425A, one or more additional object feature vectors 425B for one or more additional objects represented by the first image 325 (e.g., as identified by the key point 315), and a background feature vector 425C. By way of example, given the key points 315 (e.g., denoted $P_t = p_{t,n_{t=1}}^{N_t}$) highlighted by the annotator, the system 400 can extract using bilinear interpolation a number of feature vectors in the feature matrix 425 (e.g., $N_t$ vectors of dimension D) from the first feature map 415 (e.g., $F_t$). Each extracted feature vector of feature matrix 425 can capture spatio-temporal semantic information about a corresponding object specified by the user input. The system 400 can match each pixel in the second image 405 to one of the feature vectors in feature matrix 425 (e.g., $N_t$ instances).

In addition to the object feature vector 425A and the additional object feature vectors 425B, a pixel of the second image 405 can correspond to a background which could include another object appearing for the first time in the second image 405. To address this concern, the feature matrix 425 can include a background feature vector 425C. The background feature vector 425C can include a global learnable D-dimensional feature vector corresponding to the background. The system 400 can concatenate the object feature vectors 425A, B (e.g., $N_t$ object feature vectors) and the background feature vector 425C to create the feature matrix 425 (e.g., denoted as E of dimensions $(N_t+1) \times D$) which can be used to construct the correlation volume 430.

The system 400 can determine the compatibility score for a pixel of the second image 405 based on the feature matrix 425. To do so, the system 400 can determine a pixel feature vector from the second feature map 420. The pixel feature vector can correspond to the pixel of the second image 405. The system 400 can generate the correlation volume 430 for the second image 405 based on a dot product between the pixel feature vector and each row of the feature matrix 425. The correlation volume 430 for the second image 405 can be indicative of a respective compatibility score for the object feature vector 425A, the one or more additional object feature vectors 425B, and the background feature vector 425C. This can be repeated for each pixel of the second image 405 such that the correlation volume 430 can include a respective compatibility score for the object feature vector 425A, the one or more additional object feature vectors 425B, and the background feature vector 425C for each pixel of the second image 405. The system 400 can generate the segmentation mask 355 for the first object 320 and/or additional segmentation masks 360 for any additional objects within the second image 405 based on the correlation volume 430 for the second image 405.

By way of example, to obtain the segmentation masks 360 in the second image 405 corresponding to either the plurality of objects in the first image 325 or the background, the system 400 can construct a correlation volume 430 (e.g., denoted as $C_{t+1}^0 \in \mathbb{R}^{(N_t+1) \times H/4 \times W/4}$ where $C_{t+1}^0(n, i, j)$, which scores the compatibility of feature pixel (i, j) in $F_{t+1}$ with row n of E, which is the feature vector of either the background or one of the $N_t$ instances in $I_t$). The correlation volume 430 can be constructed by taking the dot product between the rows of the feature matrix 425 (e.g., E) and each feature pixel in of the second feature map 420 as follows:

$$C_{t+1}^0(n, i, j) = \sum_h E(n, h) F_{t+1}(h, i, j)$$

The correlation volume 430 can be converted into segmentation masks 360 by taking an argmax along the first dimension of $C_{t+1}^0$:

$$M_{t+1}^0(i,j) = n C_{t+1}^0(n,i,j)$$

By way of example, each respective pixel can be assigned to a respective object and/or the background associated with the highest compatibility score of the correlation volume determined for the respective pixel. For instance, a respective segmentation mask for a respective object can include a plurality of pixels with compatibility scores associated with the respective object that are higher than compatibility scores determined for the plurality of pixels for the other objects and/or the background. An object can be considered to be occluded in the second image 405 in the event an area of its segmentation mask is less than a threshold obtained from a validation set.

In some implementations, the correlation volume 430 can be refined for a number of iterations by a recurrent attention network 435. For example, the system 400 can iteratively process the correlation volume 430 for the second image 405 with a recurrent attention network 435 to generate a refined correlation volume 470 for the second image 405. The system 400 can generate the segmentation mask 355 for the first object 320 and additional segmentation masks 360 for additional objects within the second image 405 based on the refined correlation volume 470 for the second image 405.

To generate the refined correlation volume 470, the system 400 can process the second image 405 with a machine-learned contextual model 445 to generate a contextual feature map 450 for the second image 405. By way of example, the system 400 can process the second image 405 with the encoder network 440A of the feature extraction model 410 (e.g., the siamese encoder-decoder network) to extract a plurality of features for the second image 405. The plurality of features for the second image 405 can be processed with the machine-learned contextual model 445 to generate the contextual feature map 450 for the second image 405. The refined correlation volume 470 for the second image 405 can be generated based on the correlation volume 430 for the second image 405 and the contextual feature map 450.

In this manner, the system 400 can refine the correlation volume 430 (e.g., $C_{t+1}^0$) using a recurrent attention network 435 that depends on the correlation volume 430 (e.g., $C_{t+1}^0$) and a contextual feature map 450 that includes features extracted solely from the second image 405. For example, the encoder features (e.g., contextual feature map 450) of the second image 405 can be input to the machine-learned contextual model 445 (e.g., another decoder) to obtain the contextual feature map 450 (e.g., denoted $F_{context} \in \mathbb{R}^{D \times H/4 \times W/4}$) which can have better localized information about the object boundaries in the second image 405 without being affected by the features of the first image 325. At each refinement step (e.g., $\tau$), the feature channels from the contextual feature map 450 (e.g., $F_{context}$) that are closest to a predicted instance mask captured in the correlation volume 430 can be used to refine the correlation volume 430.

To do so, the system 400 can map the contextual feature map 450 (e.g., $F_{context}$) to a key feature tensor 460 (e.g., embedding tensor $F_{key}$) and a value feature tensor 455 (e.g., embedding tensor $F_{value}$) using two residual blocks. The correlation volume 430 (e.g., denoted $C_{t+1}^{\tau-1}$) can be converted to a probability tensor (e.g., denoted $S^{\tau-1}$) by taking a softmax along its first dimension. Each channel of the probability tensor can represent a probability mask of a corresponding object or the background.

The system 400 can compute an attention matrix (e.g., denoted $A^{\tau-1} \in \mathbb{R}^{(N_t+1) \times D}$) between the probability tensor and the key feature tensor 460:

$$A^{\tau-1}(n, d) = dim = 1 \sum_{i,j} S^{\tau-1}(n, i, j) F_{key}(d, i, j)$$

As an example, the notation $A^{\tau-1}(n, d)$ can measure the compatibility of a probability mask of the n-th object or the background and the d-th feature channel of the key feature tensor 460. The system 400 can multiply the attention matrix (e.g., $A^{\tau-1}$) by the value feature tensor 455 (e.g., $F_{value}$) to obtain a residual score that can be added to the correlation volume 430 (e.g., $C_{t+1}^{\tau-1}$) to obtain the refined correlation volume 470:

$$C_{t+1}^\tau = C_{t+1}^{\tau-1} + A^{\tau-1} F_{value}$$

The system 400 can repeat the refinement process for a fixed number of timesteps.

The system 400 can extend the object segmentation process to each image in the sequence of images. For example, the system 400 can receive a third image (e.g., of the sequence of images) associated with a third time subsequent to the second time corresponding to the second image 405. In addition, the system 400 can receive additional user input indicative of a position within the second image 405. The system 400 can leverage the additional user input to update the refined correlation volume 470 for the second image 405 and generate a new correlation volume for the third image.

For example, the system 400 can identify one or more additional objects within the second image 405 based on the additional user input. The additional objects, for example, can include objects that are not visible (e.g., occluded, out of frame, etc.) or not identified for the first image 325. The system 400 can generate an updated correlation volume for the second image 405 based on the refined correlation volume 470 for the second image 405 and the additional user input. The updated correlation volume can include the correlation values for each pixel of the second image 405 that correspond to each of the first objects identified by the key points 315 for the first image 325, the background, and each of the second objects identified by key points for the second image 405. The system 400 can generate a second segmentation mask for the second object(s) within the second image 405 based on the updated correlation volume for the second image 405.

By way of example, given the refined correlation volume 470 (e.g., $\hat{C}_t$) and new key points (e.g., $P_t$) for the second image 405, the system 400 can apply the machine-learned model(s) disclosed herein on the second image 405 to obtain an updated correlation volume (e.g., CO. For example, whereas the refined correlation volume 470 (e.g., $\hat{C}_t$) can identify the compatibility of each pixel in the second image 405 to objects appearing in first image 325 (e.g., and other preceding image frames $I_{t-1}$), the updated correlation volume (e.g., $C_t$) can take into account both the refined correlation volume 470 (e.g., $\hat{C}_t$) and the new user input (e.g., $P_t$). The segmentation masks 360 (e.g., $M_t$) for the second image 405 can be obtained from the updated correlation volume (e.g., $C_t$).

The system 400 can generate a correlation volume for the third image based on the updated correlation volume for the second image 405, the second feature map 420, and the additional user input. For example, the segmentation mask 355 for the first object 320 within the second image 405 can be indicative of a plurality of pixels of the second image 405 that correspond to the first object 320. The system 400 can identify a subset of the plurality of pixels associated with a relative correlation score above a threshold correlation score based on the updated correlation volume. The system 400 can generate a cumulative object feature vector for the first object 320 based on the subset of the plurality of pixels and the second feature map 420 of the second image 405. This can be repeated for each object of the updated correlation volume.

For example, the system 400 can obtain feature vectors corresponding to key points identified in the second image 405 and the updated correlation volume. For the key points, the system 400 can use bilinear interpolation to extract key point features from second feature map 420. The system 400 can convert the refined correlation volume 470 to a set of key point features by obtaining the segmentation mask 360 of each object from the refined correlation volume 470. In order to remove potential mask outliers, the system 400 can find the coordinates of the top 50% highest scoring mask pixels for each object and average those points on the second feature map 420 to create a D-dimensional feature vector for each object. The system 400 can provide the consecutive frames (e.g., the second image 405 and the third image) and the cumulative object feature vectors corresponding to the updated correlation model (e.g., $C_t$) to the one or more machine-learning model(s) (e.g., the machine-learned feature extraction model 410, the recurrent attention network 435, etc.) described herein to obtain a refined correlation volume (e.g., $\hat{C}_{t+1}$) for the third image in the manner described above.

By way of example, the refined correlation volume for the third image can be generated based on the cumulative object feature vector for the first object 320. For example, the system 400 can process the third image with the machine-learned feature extraction model 410 to generate a third feature map for the third image. The compatibility score for a pixel of the third image can be determined based on a comparison between the cumulative object feature vector and the third feature map in the manner described above. This process can be repeated for each object identified by the updated correlation volume.

Figure 5:
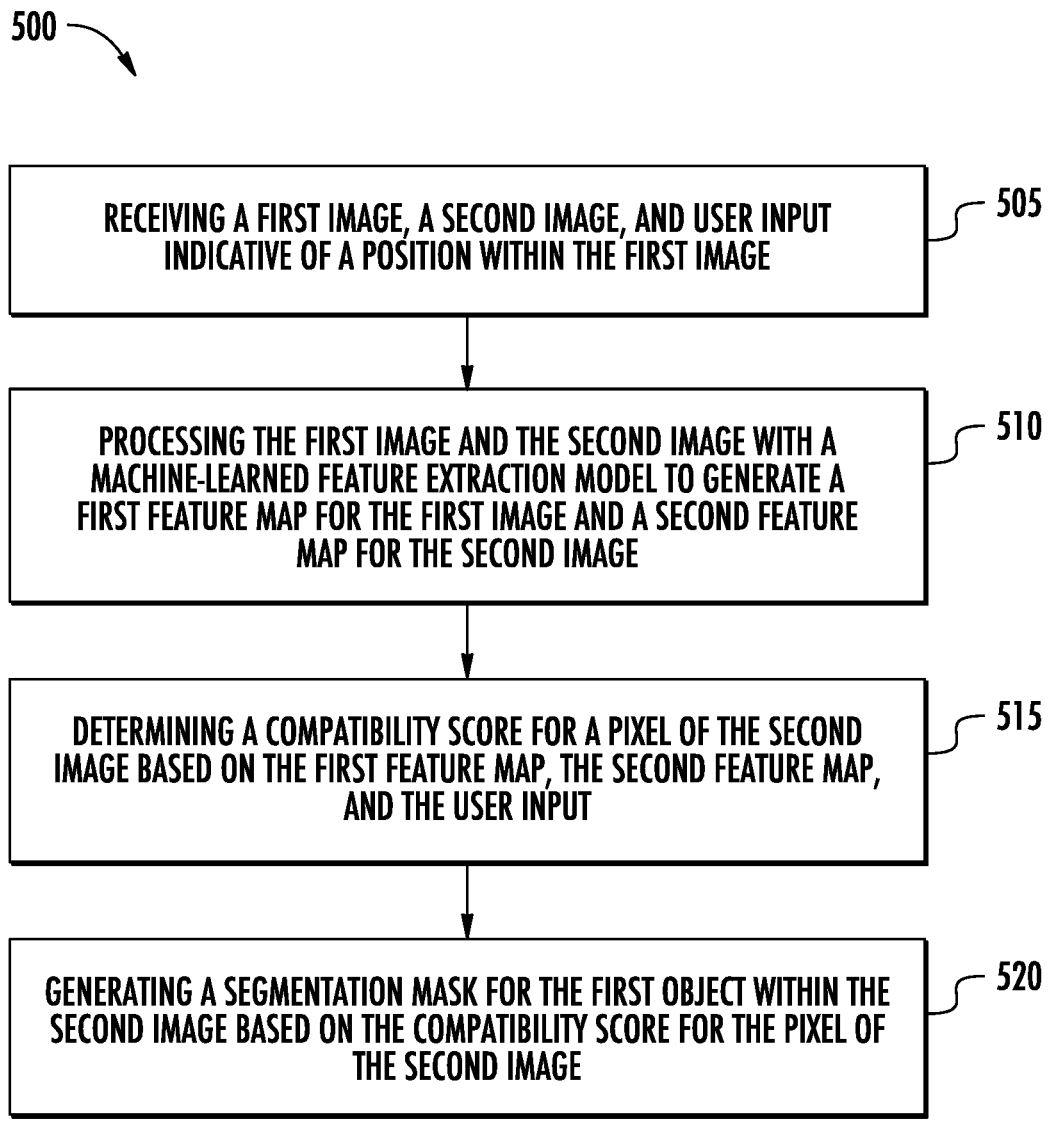
FIG. 5 is a flowchart of a method for generating a segmentation mask for a second image in a sequence of images, according to some implementations of the present disclosure.

FIG. 5 is a flowchart of a method 500 for generating a segmentation mask for a second image in a sequence of images, according to some aspects of the present disclosure. One or more portion(s) of the method 500 can be implemented by the computing systems described with reference to the other figures (e.g., autonomous platform 105, vehicle computing system 210, operations computing system(s) 290A, remote computing system(s) 290B, system 400, etc.). Each respective portion of the method 500 can be performed by any (or any combination) of one or more computing devices. Moreover, one or more portion(s) of the method 500 can be implemented as an algorithm on the hardware components of the device(s) described herein (e.g., as in FIGS. 1-2, 4, 10, etc.), for example, to generate a segmentation mask as discussed herein. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5 is described with reference to elements/terms described with respect to other systems and figures for exemplary illustrated purposes and is not meant to be limiting. One or more portions of method 500 can be performed additionally, or alternatively, by other systems.

At 505, the method 500 includes receiving a first image, a second image, and user input indicative of a position within the first image. For example, a computing system (e.g., autonomous platform 105, vehicle computing system 210, operations computing system(s) 290A, remote computing system(s) 290B, system 400, etc.) can receive the first image, the second image, and the user input indicative of the position within the first image.

At 510, the method 500 includes processing the first image and the second image with a machine-learned feature extraction model to generate a first feature map for the first image and a second feature map for the second image. For example, the computing system can process the first image and the second image with the machine-learned feature extraction model to generate the first feature map for the first image and the second feature map for the second image.

At 515, the method 500 includes determining the compatibility score for the pixel of the second image based on the first feature map, the second feature map, and the user input. For example, the computing system can determine the compatibility score for the pixel of the second image based on the first feature map, the second feature map, and the user input.

At 520, the method 500 includes generating a segmentation mask for the first object within the second image based on the compatibility score for the pixel of the second image. For example, the computing system can generate the segmentation mask for the first object within the second image based on the compatibility score for the pixel of the second image.

Figure 6:
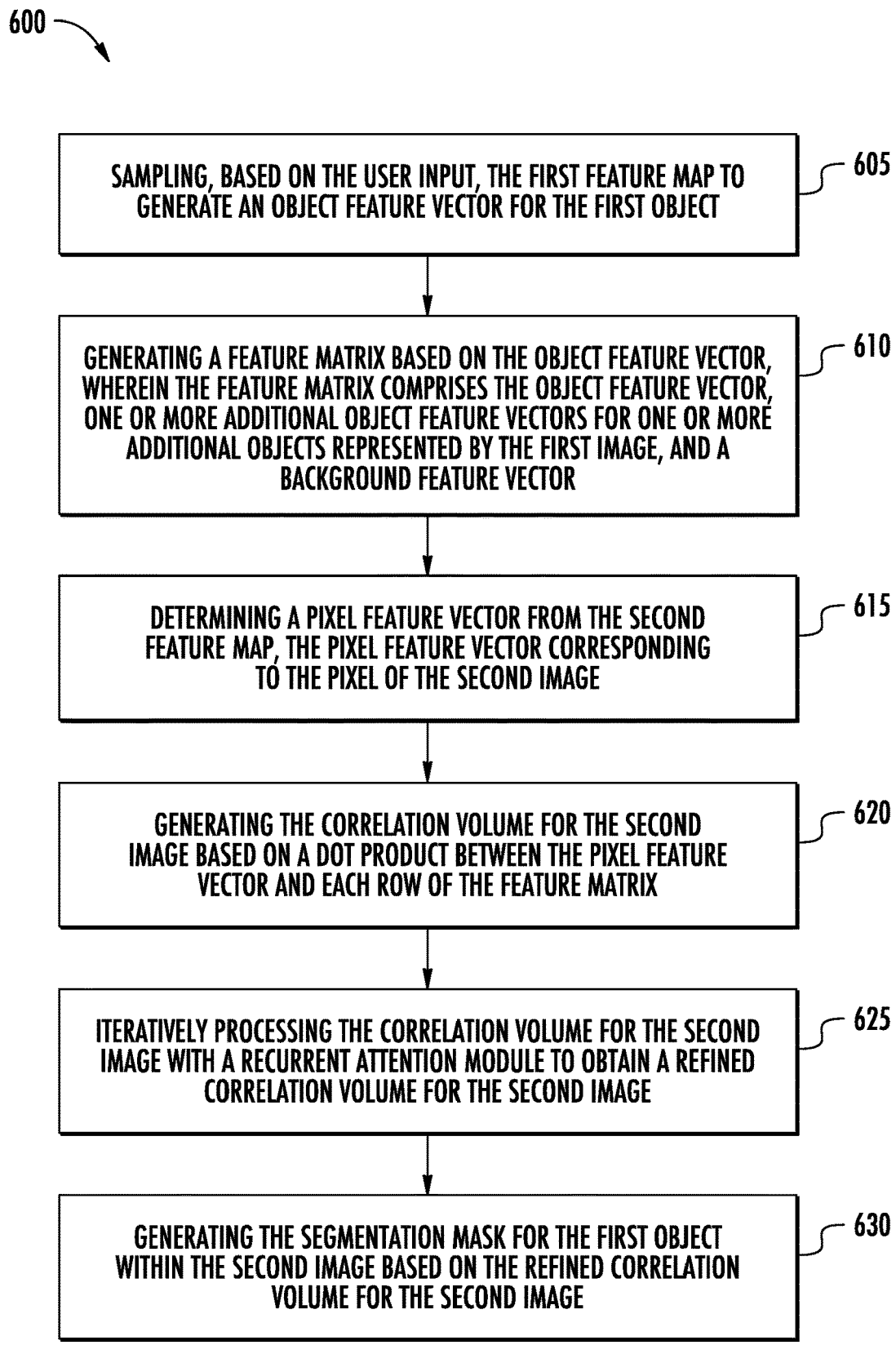
FIG. 6 is a flowchart of a method for generating a segmentation mask using a refined correlation volume, according to some implementations of the present disclosure.

FIG. 6 is a flowchart of a method 600 for generating a segmentation mask using a refined correlation volume, according to some aspects of the present disclosure. One or more portion(s) of the method 600 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 400, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1-2, 4, 10, etc.), for example, to generate a segmentation mask using a refined correlation volume as discussed herein. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

Operations 515 and 520 of FIG. 5 may comprise some or all of the operations of the method 600.

At 605, the method 600 includes sampling, based on the user input, the first feature map to generate an object feature vector for the first object. For example, a computing system (e.g., autonomous platform 105, vehicle computing system 210, operations computing system(s) 290A, remote computing system(s) 290B, system 400, etc.) can sample, based on the user input, the first feature map to generate the object feature vector for the first object.

At 610, the method 600 includes generating a feature matrix based on the object feature vector. For example, the computing system can generate the feature matrix based on the object feature vector. The feature matrix can include the object feature vector, one or more additional object feature vectors for one or more additional objects represented by the first image, and a background feature vector.

At 615, the method 600 includes determining a pixel feature vector from the second feature map. For example, the computing system can determine the pixel feature vector from the second feature map. The pixel feature vector can correspond to the pixel of the second image.

At 620, the method 600 includes generating the correlation volume for the second image based on a dot product between the pixel feature vector and each row of the feature matrix. For example, the computing system can generate the correlation volume for the second image based on the dot product between the pixel feature vector and each row of the feature matrix.

At 625, the method 600 includes iteratively processing the correlation volume for the second image with a recurrent attention module to obtain a refined correlation volume for the second image. For example, the computing system can iteratively process the correlation volume for the second image with the recurrent attention module to obtain the refined correlation volume for the second image.

At 630, the method 600 includes generating the segmentation mask for the first object within the second image based on the refined correlation volume for the second image. For example, the computing system can generate the segmentation mask for the first object within the second image based on the refined correlation volume for the second image.

Figure 7:
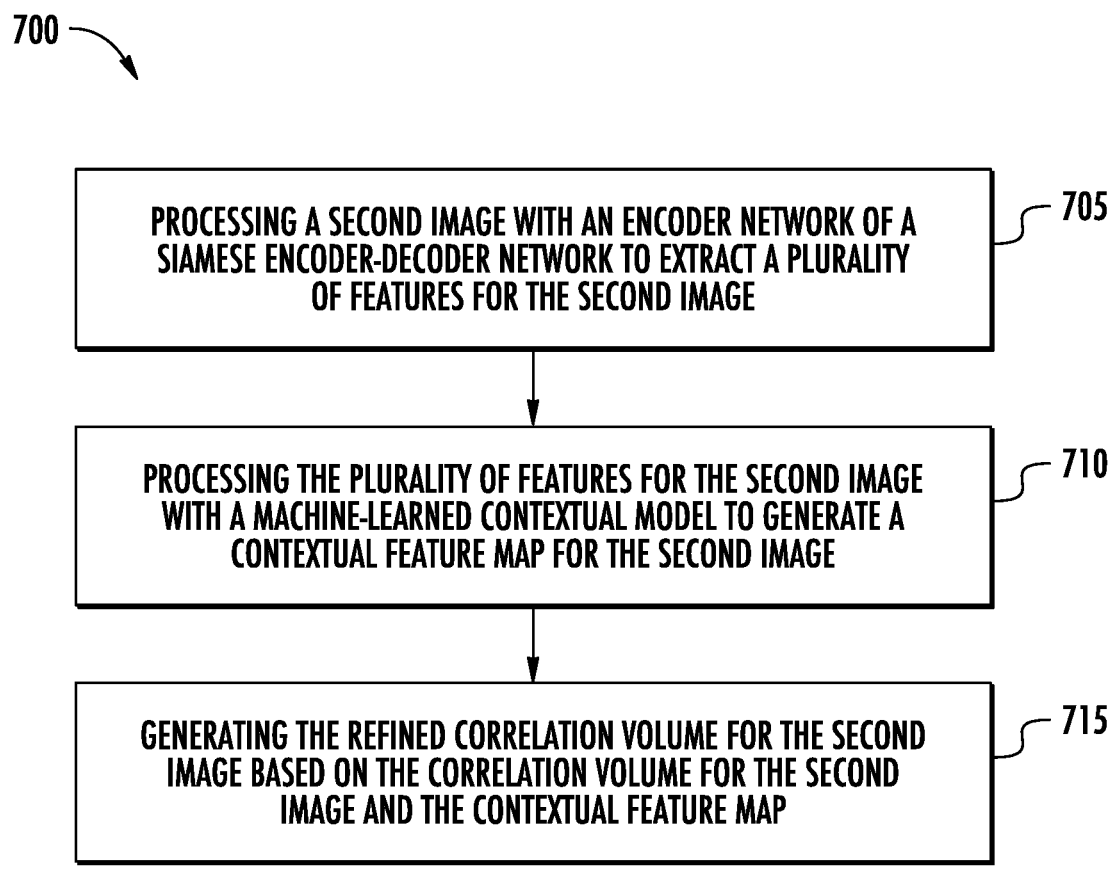
FIG. 7 is a flowchart of a method for processing a correlation volume with a recurrent attention module, according to some implementations of the present disclosure.

FIG. 7 is a flowchart of a method 700 for processing a correlation volume with a recurrent attention module, according to some aspects of the present disclosure. One or more portion(s) of the method 700 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 400, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-2, 4, 10, etc.), for example, to process a correlation volume with a recurrent attention module as discussed herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

Operation 625 of FIG. 6 may comprise some or all of the operations of the method 700.

At 705, the method 700 includes processing a second image with an encoder network of a siamese encoder-decoder network to extract a plurality of features for the second image. For example, a computing system (e.g., autonomous platform 105, vehicle computing system 210, operations computing system(s) 290A, remote computing system(s) 290B, system 400, etc.) can process the second image with the encoder network of the siamese encoder-decoder network to extract the plurality of features for the second image.

At 710, the method 700 includes processing the plurality of features for the second image with a machine-learned contextual model to generate a contextual feature map for the second image. For example, the computing system can process the plurality of features for the second image with the machine-learned contextual model to generate the contextual feature map for the second image.

At 715, the method 700 includes generating the refined correlation volume for the second image based on the correlation volume for the second image and the contextual feature map. For example, the computing system can generate the refined correlation volume for the second image based on the correlation volume for the second image and the contextual feature map.

Figure 8:
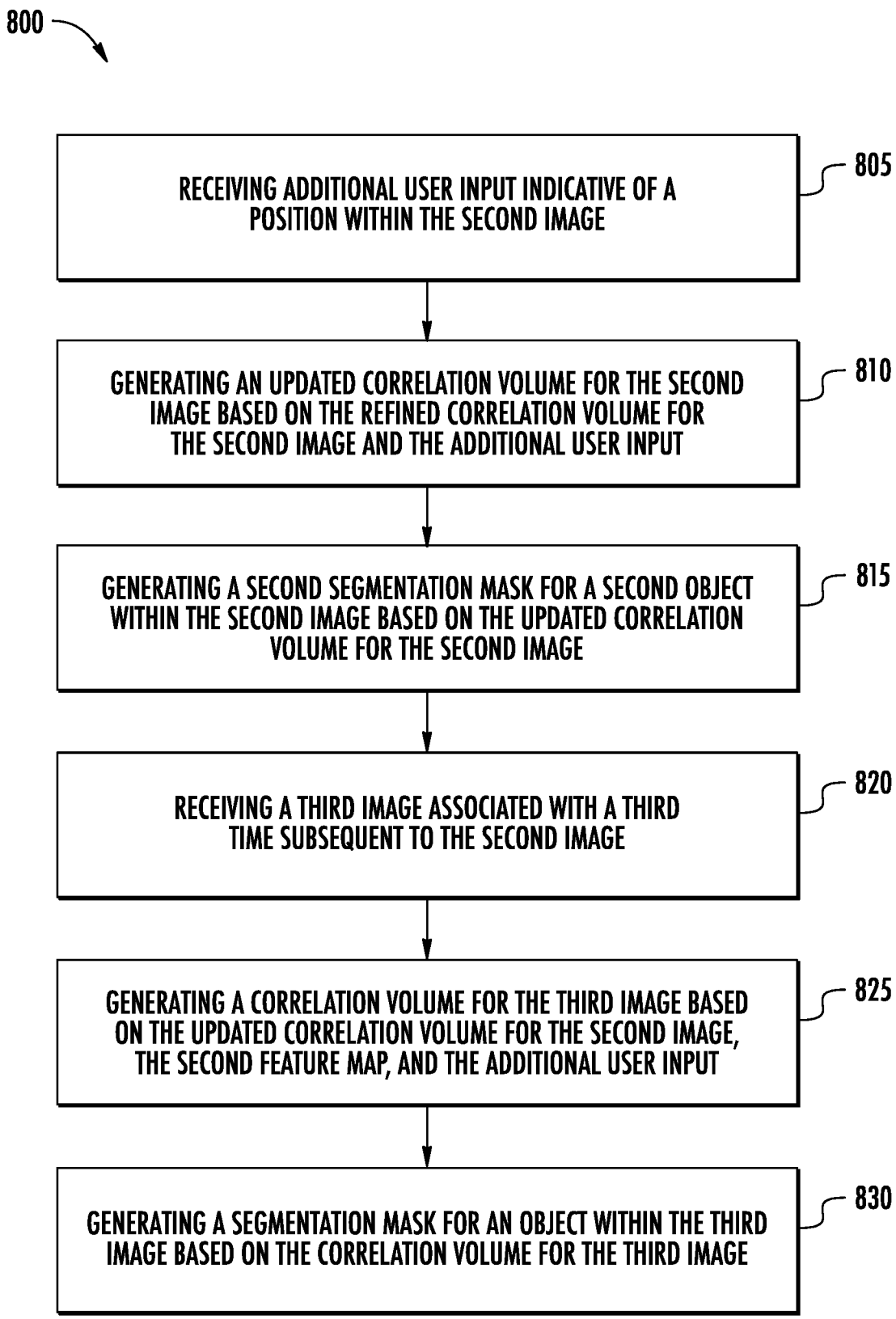
FIG. 8 is a flowchart of a method for generating a segmentation mask for a third image in a sequence of images, according to some implementations of the present disclosure.

FIG. 8 is a flowchart of a method 800 for generating a segmentation mask for a third image in a sequence of images. One or more portion(s) of the method 800 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 400, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-2, 4, 10, etc.), for example, to generate a segmentation mask for the third image in a sequence of images as discussed herein. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

The method 800 can begin after operation 520 of FIG. 5 where the method 500 includes generating a segmentation mask for the first object within the second image based on the compatibility score for the pixel of the second image.

At 805, the method 800 includes receiving additional user input indicative of a position within the second image. For example, a computing system (e.g., autonomous platform 105, vehicle computing system 210, operations computing system(s) 290A, remote computing system(s) 290B, system 400, etc.) can receive additional user input indicative of a position within the second image.

At 810, the method 800 includes generating an updated correlation volume for the second image based on the refined correlation volume for the second image and the additional user input. For example, the computing system can generate the updated correlation volume for the second image based on the refined correlation volume for the second image and the additional user input.

At 815, the method 800 includes generating a second segmentation mask for a second object within the second image based on the updated correlation volume for the second image. For example, the computing system can generate the second segmentation mask for the second object within the second image based on the updated correlation volume for the second image.

At 820, the method 800 includes receiving a third image associated with a third time subsequent to the second time. For example, the computing system can receive a third image associated with the third time subsequent to the second time.

At 825, the method 800 includes generating a correlation volume for the third image based on the updated correlation volume for the second image, the second feature map, and the additional user input. For example, the computing system can generate the correlation volume for the third image based on the updated correlation volume for the second image, the second feature map, and the additional user input.

At 830, the method 800 includes generating a segmentation mask for an object within the third image based on the correlation volume for the third image. For example, the computing system can generate the segmentation mask for the object within the third image based on the correlation volume for the third image.

Figure 9:
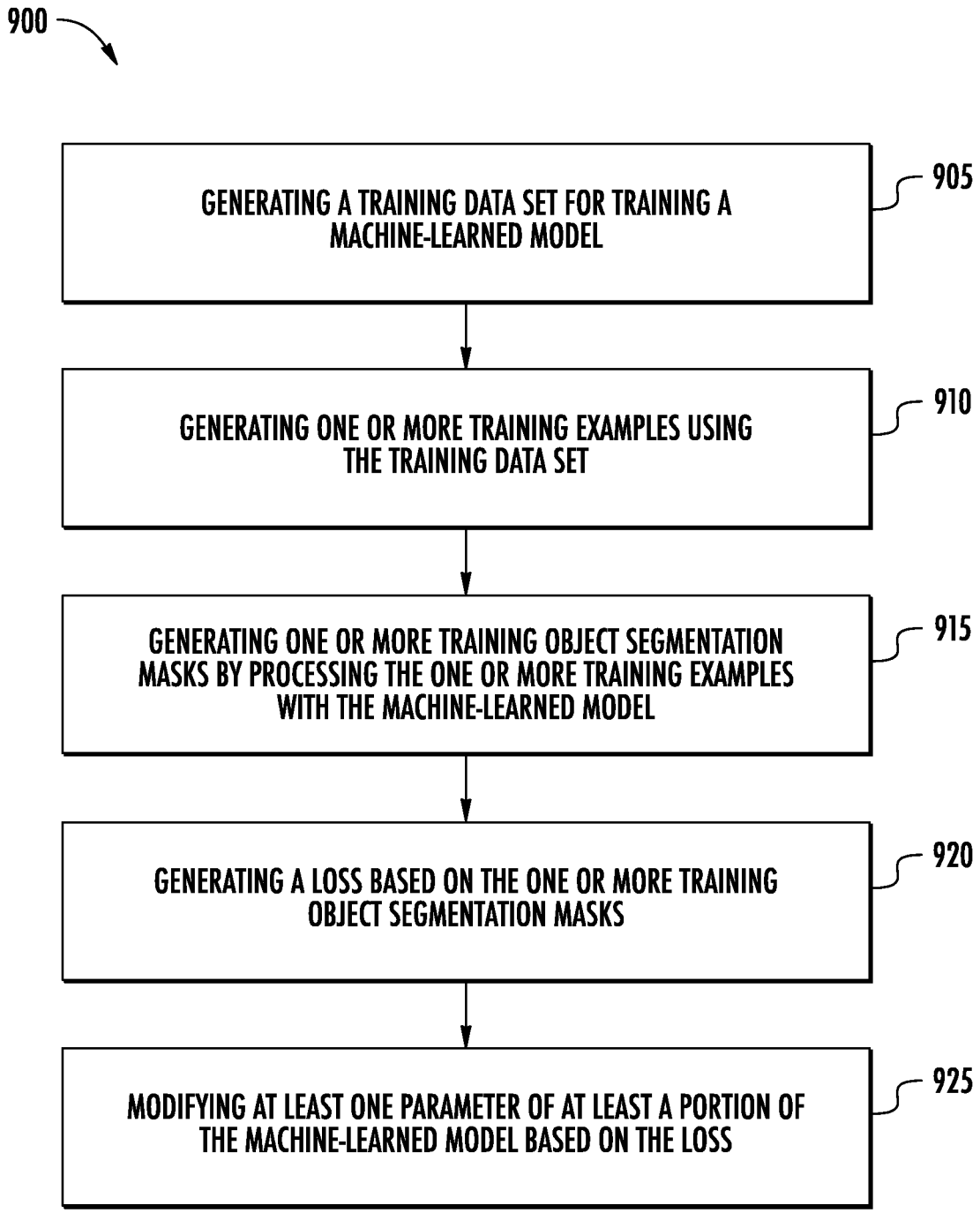
FIG. 9 is a flowchart of a method for training a machine-learned model, according to some implementations of the present disclosure.

FIG. 9 is a flowchart of a method 900 for training a machine-learned model, according to some aspects of the present disclosure. One or more portion(s) of the method 900 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 400, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-2, 4, 10, etc.), for example, to train a machine-learned model as discussed herein. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 905, the method 900 includes generating a training data set for training a machine-learned model. For example, a computing system (e.g., autonomous platform 105, vehicle computing system 210, operations computing system(s) 290A, remote computing system(s) 290B, system 400, etc.) can generate the training data set for training the machine-learned model. The training data set, for example, can include a video dataset of pairs of images. Each pair can include one or more of the same images or at least two consecutive images. In some implementations, the training dataset can be augmented by random horizontal flipping with equal probability.

At 910, the method 900 includes generating one or more training examples using the training data set. For example, the computing system can generate the one or more training examples using the training data set. The one or more training examples, for example, can include one or more image pairs from the training dataset and/or one or more ground truth object segmentations for at least one of the one or more image pairs.

At 915, the method 900 includes generating one or more training object segmentation masks by processing the one or more training examples with the machine-learned model. For example, the computing system can generate the one or more training object segmentation masks by processing the one or more training examples with the machine-learned model. The training object segmentation masks can include a plurality of object masks for the one or more training examples. Each training object segmentation mask can be generated based on a keypoint (e.g., coordinates) identifying a position within a representation of a training object within at least one of the one or more training examples. A respective keypoint, for instance, can include any position within and/or along a boundary of a respective object.

At 920, the method 900 includes generating a loss based on the one or more training object segmentation masks. For example, the computing system can generate the loss based on the one or more training object segmentation masks. The loss, for example, can include a cross entropy loss based on a comparison between the one or more training object segmentation masks and the one or more ground truth object segmentations for at least one of the one or more image pairs.

At 925, the method 900 includes modifying at least one parameter of at least a portion of the machine-learned model based on the loss. For example, the computing system can modify at least one parameter of at least a portion of the machine-learned model based on the loss. By way of example, the parameters of the machine-learned model can be learned in an end-to-end fashion. By way of example, from images (e.g., $I_t$, $I_{t+1}$) and key points (e.g., $P_t$) the computing system can obtain a sequence of refined correlation volumes (e.g., $C_{t+1}^\tau$) corresponding to (e.g., $I_{t+i}$). The computing system can apply a softmax on the cost volumes and directly compare with ground truth masks (e.g., $M_{t+1}^{GT}$) using cross entropy. In some implementations, the computing system can sample using bilinear interpolation a fixed number of random points corresponding to the background, the object interior, and around the object boundaries from $C_{t+1}^\tau$ and $M_{t+1}^{GT}$ and compute the cross entropy on these points.

The machine-learned model can be trained on 16 RTX5000 GPUs for 25 epochs with the Adam optimizer with a learning rate of 0.0001 and weigh decay of 0.0001. For the backbone, a ResNet-101 pretrained on Imagenet can be employed with a modified version of a feature pyramid network with random initialization. In some implementations, gradient check-pointing can be employed during training.

The machine-learning techniques described herein can help create improved annotated training datasets such as, for example, the training data set described herein. The improved annotated training datasets can, in turn, be used for training machine-learned models such as those described herein and/or other machine-learned models for simulating, testing, and/or improving the performance of autonomous platforms. By way of example, the improved training datasets can increase the diversity and robustness of simulation training platform for testing the performance of an autonomous platform. As another example, the improved training datasets can be used to test, refine, and/or certify autonomy models ultimately used to navigate an autonomous platform. In some example, the autonomy models can be trained using the annotated datasets to improve autonomous functions such as forecasting, perception, or motion planning in an online autonomy system.

Figure 10:
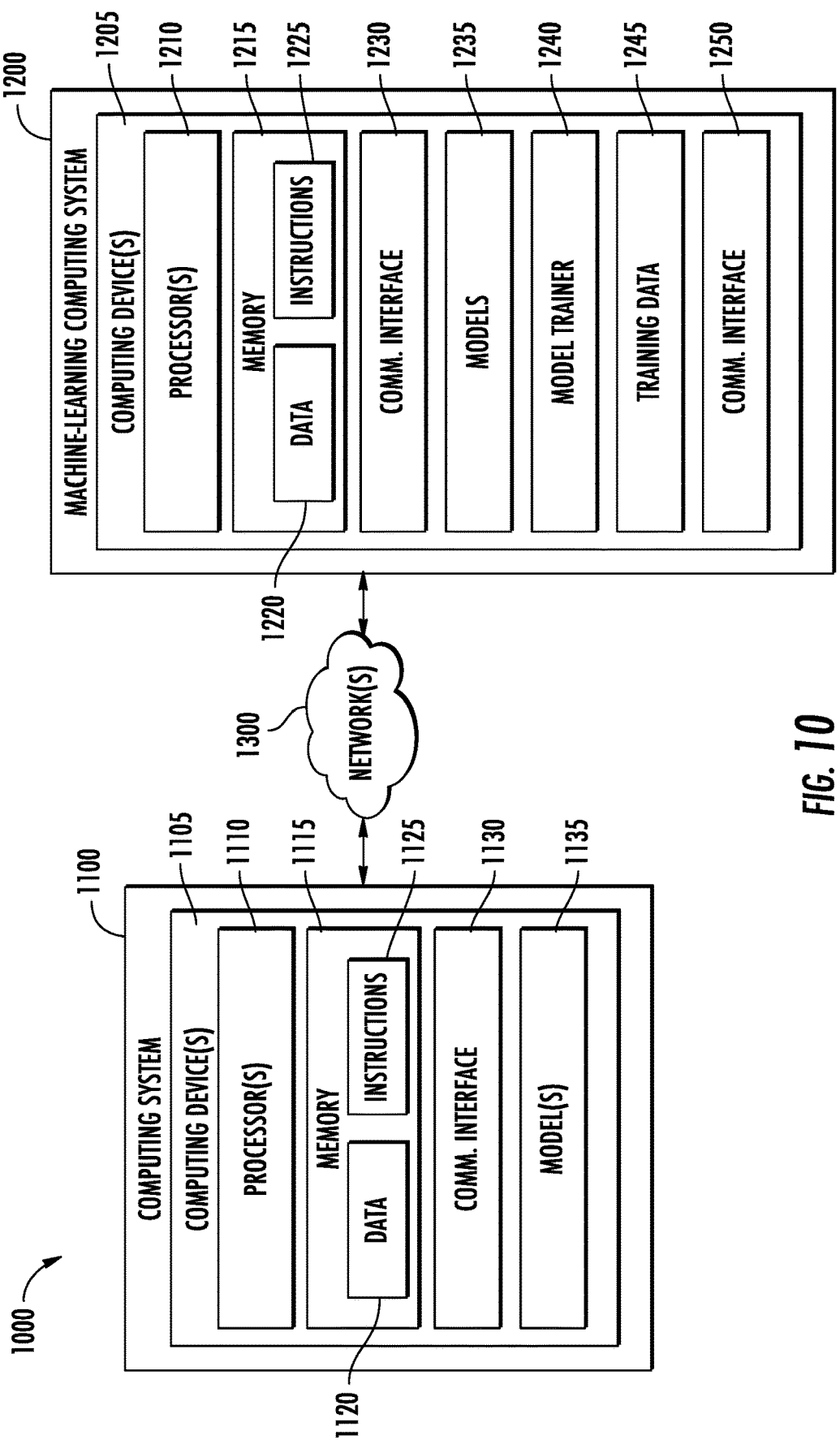
FIG. 10 is a block diagram of a computing system, according to some implementations of the present disclosure.

FIG. 10 is a block diagram of an example computing system 1000, according to some embodiments of the present disclosure. The example system 1000 includes a computing system 1100 and a machine-learning computing system 1200 that are communicatively coupled over one or more networks 1300.

In some implementations, the computing system 1100 can perform one or more observation tasks such as, for example, by obtaining sensor data (e.g., two-dimensional, three-dimensional, etc.) associated with a dynamic object. In some implementations, the computing system 1100 can be included in an autonomous platform. For example, the computing system 1100 can be on-board an autonomous vehicle. In other implementations, the computing system 1100 is not located on-board an autonomous platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, or stored. The data 1120 can include, for instance, image data, object segmentations, key point data, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110. The instructions 1125 can be software written in any suitable programming language or can be implemented in hardware. Additionally, or alternatively, the instructions 1125 can be executed in logically or virtually separate threads on processor(s) 1110.

For example, the memory 1115 can store instructions 1125 that when executed by the one or more processors 1110 cause the one or more processors 1110 (the computing system 1100) to perform any of the operations, functions, or methods/processes described herein, including, for example, generating object segmentations, etc.

According to an aspect of the present disclosure, the computing system 1100 can store or include one or more machine-learned models 1135. As examples, the machine-learned models 1135 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1100 can receive the one or more machine-learned models 1135 from the machine-learning computing system 1200 over network(s) 1300 and can store the one or more machine-learned models 1135 in the memory 1115. The computing system 1100 can then use or otherwise implement the one or more machine-learned models 1135 (e.g., by processor(s) 1110). In particular, the computing system 1100 can implement the machine-learned model(s) 1135 to generate object segmentations, etc.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, sensor data, two-dimensional data, three-dimensional, image data, LiDAR data, object model parameters, simulation data, data associated with models, or any other data or information described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations or functions described herein, including, for example, training a machine-learned video segmentation model, generating object segmentations, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1135 at the computing system 1100, the machine learning computing system 1200 can include one or more machine-learned models 1235. As examples, the machine-learned models 1235 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. By way of example, the model trainer 1240 can train the machine-learned object parameter estimation model through unsupervised energy minimization training techniques using the objective function described herein. The model trainer 1240 can perform a number of generalization techniques to improve the generalization capability of the models being trained. Generalization techniques include weight decays, dropouts, or other techniques.

The computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 10 illustrates one example system 1000 that can be used to implement the present disclosure. Other systems can be used as well. For example, in some implementations, the computing system 1100 can include the model trainer 1240 and the training dataset 1245. In such implementations, the machine-learned models 1235 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

What is claimed is:

1. A computer-implemented method, comprising:
   (a) receiving a first image, a second image, and user input indicative of a position within the first image;
   (b) processing the first image and the second image with a machine-learned feature extraction model to generate a first feature map for the first image and a second feature map for the second image;
   (c) sampling, based on the user input, the first feature map to generate an object feature vector for the first object;
   (d) generating a feature matrix based on the object feature vector, wherein the feature matrix comprises the object feature vector, one or more additional object feature vectors for one or more additional objects represented by the first image, and a background feature vector;
   (e) determining a compatibility score for a pixel of the second image based on the first feature map, the second feature map, the feature matrix, and the user input, wherein the compatibility score is indicative of a probability that the pixel of the second image corresponds to a first object represented at the position within the first image; and
   (f) generating a segmentation mask for the first object within the second image based on the compatibility score for the pixel of the second image.

2. The computer-implemented method of claim 1, wherein the user input identifies coordinates within the first image, and wherein the object feature vector corresponds to the coordinates within the first image.

3. The computer-implemented method of claim 1, wherein (e) and (f) comprise:
   determining a pixel feature vector from the second feature map, the pixel feature vector corresponding to the pixel of the second image;
   generating a correlation volume for the second image based on a dot product between the pixel feature vector and each row of the feature matrix, wherein the correlation volume for the second image is indicative of a respective compatibility score for the object feature vector, the one or more additional object feature vectors, and the background feature vector; and
   generating the segmentation mask for the first object within the second image based on the correlation volume for the second image.

4. The computer-implemented method of claim 1, wherein (e) comprises:
   generating a correlation volume for the second image from the compatibility score for the pixel of the second image and a plurality of additional compatibility scores for the pixel of the second image.

5. The computer-implemented method of claim 4, further comprising:
   iteratively processing the correlation volume for the second image with a recurrent attention module to obtain a refined correlation volume for the second image; and
   generating the segmentation mask for the first object within the second image based on the refined correlation volume for the second image.

6. The computer-implemented method of claim 5, wherein processing the correlation volume for the second image with the recurrent attention module comprises:
   processing the second image with a machine-learned contextual model to generate a contextual feature map for the second image; and
   generating the refined correlation volume for the second image based on the correlation volume for the second image and the contextual feature map.

7. The computer-implemented method of claim 6, wherein the feature extraction model comprises a siamese encoder-decoder network, and wherein processing the second image with the machine-learned contextual model to generate the contextual feature map for the second image comprises:
   processing the second image with an encoder network of the siamese encoder-decoder network to extract a plurality of features for the second image; and
   processing the plurality of features for the second image with the machine-learned contextual model to generate the contextual feature map for the second image.

8. The computer-implemented method of claim 5, further comprising:
   (g) receiving additional user input indicative of a position within the second image;
   (h) generating an updated correlation volume for the second image based on the refined correlation volume for the second image and the additional user input; and
   (i) generating a second segmentation mask for a second object within the second image based on the updated correlation volume for the second image.

9. The computer-implemented method of claim 8, wherein the first image is associated with a first time and the second image is associated with a second time subsequent to the first time.

10. The computer-implemented method of claim 9, further comprising:
    (j) receiving a third image associated with a third time subsequent to the second time; and
    (k) generating a correlation volume for the third image based on the updated correlation volume for the second image, the second feature map, and the additional user input.

11. The computer-implemented method of claim 10, wherein the segmentation mask for the first object within the second image is indicative of a plurality of pixels of the second image that correspond to the first object, and wherein (k) comprises:
    identifying a subset of the plurality of pixels associated with a relative correlation score above a threshold correlation score;
    generating a cumulative object feature vector for the first object based on the subset of the plurality of pixels and the second feature map of the second image; and
    generating the correlation volume for the third image based on the cumulative object feature vector for the first object.

12. The computer-implemented method of claim 11, wherein generating the correlation volume for the third image based on the cumulative object feature vector for the first object comprises:
    processing the third image with the machine-learned feature extraction model to generate a third feature map for the third image; and
    determining a compatibility score for a pixel of the third image based on a comparison between the cumulative object feature vector and the third feature map.

13. A computing system comprising:
    one or more processors; and
    one or more computer-readable medium storing instructions that are executable by the one or more processors to cause the computing system to perform operations, the operations comprising:
    (a) receiving a first image, a second image, and user input indicative of a position within the first image;
    (b) processing the first image and the second image with a machine-learned feature extraction model to generate a first feature map for the first image and a second feature map for the second image;
    (c) sampling, based on the user input, the first feature map to generate an object feature vector for the first object;
    (d) generating a feature matrix based on the object feature vector, wherein the feature matrix comprises the object feature vector, one or more additional object feature vectors for one or more additional objects represented by the first image, and a background feature vector;
    (e) determining a compatibility score for a pixel of the second image based on the first feature map, the second feature map, the feature matrix, and the user input, wherein the compatibility score is indicative of a probability that the pixel of the second image corresponds to a first object represented at the position within the first image; and
    (f) generating a segmentation mask for the first object within the second image based on the compatibility score for the pixel of the second image.

14. The computing system of claim 13, wherein the user input identifies coordinates within the first image, and wherein the object feature vector corresponds to the coordinates within the first image.

15. The computing system of claim 13, wherein (e) and (f) comprise:
    determining a pixel feature vector from the second feature map, the pixel feature vector corresponding to the pixel of the second image;
    generating a correlation volume for the second image based on a dot product between the pixel feature vector and each row of the feature matrix, wherein the correlation volume for the second image is indicative of a respective compatibility score for the object feature vector, the one or more additional object feature vectors, and the background feature vector; and
    generating the segmentation mask for the first object within the second image based on the correlation volume for the second image.

16. The computing system of claim 15, wherein (f) comprises:
    processing the second image with a machine-learned contextual model to generate a contextual feature map for the second image; and
    generating a refined correlation volume for the second image based on the correlation volume for the second image and the contextual feature map.

17. One or more tangible, non-transitory, computer readable media that store instructions that are executable by one or more processors to cause the one or more processors to perform operations comprising:
    (a) receiving a first image, a second image, and user input indicative of a position within the first image;
    (b) processing the first image and the second image with a machine-learned feature extraction model to generate a first feature map for the first image and a second feature map for the second image;
    (c) sampling, based on the user input, the first feature map to generate an object feature vector for the first object;
    (d) generating a feature matrix based on the object feature vector, wherein the feature matrix comprises the object feature vector, one or more additional object feature vectors for one or more additional objects represented by the first image, and a background feature vector;
    (e) determining a compatibility score for a pixel of the second image based on the first feature map, the second feature map, the feature matrix, and the user input, wherein the compatibility score is indicative of a probability that the pixel of the second image corresponds to a first object represented at the position within the first image; and
    (f) generating a segmentation mask for the first object within the second image based on the compatibility score for the pixel of the second image.

* * * * *

UNITED STATES PATENT AND TRADEMARK OFFICE
CERTIFICATE OF CORRECTION

| | | |
|---|---|---|
| PATENT NO. | : 11,562,490 B2 | |
| APPLICATION NO. | : 17/528567 | |
| DATED | : January 24, 2023 | |
| INVENTOR(S) | : Namdar Homayounfar, Wei-Chiu Ma and Raquel Urtasun | |

It is certified that error appears in the above-identified patent and that said Letters Patent is hereby corrected as shown below:

On the Title Page

Under Item (72) Inventors, please add Justin Liang, Surrey (CA)

Signed and Sealed this
Seventh Day of May, 2024

Katherine Kelly Vidal
*Director of the United States Patent and Trademark Office*